US007618722B2

(12) United States Patent
Hirayama et al.

(10) Patent No.: US 7,618,722 B2
(45) Date of Patent: Nov. 17, 2009

(54) PERPENDICULAR MAGNETIC RECORDING MEDIA AND MAGNETIC STORAGE APPARATUS USING THE SAME

(75) Inventors: Yoshiyuki Hirayama, Tokyo (JP); Ikuko Takekuma, Kanagawa (JP); Hiroyuki Nakagawa, Kanagawa (JP); Yuzuru Hosoe, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/079,701

(22) Filed: Mar. 27, 2008

(65) Prior Publication Data

US 2008/0182134 A1 Jul. 31, 2008

Related U.S. Application Data

(62) Division of application No. 10/977,552, filed on Oct. 29, 2004, now Pat. No. 7,368,185.

(30) Foreign Application Priority Data

Dec. 24, 2003 (JP) ............................. 2003-427706

(51) Int. Cl.
*G11B 5/66* (2006.01)
(52) U.S. Cl. .................................. 428/831.2
(58) Field of Classification Search .................. None
See application file for complete search history.

(56) References Cited

U.S. PATENT DOCUMENTS 7,183,011 B2 * 2/2007 Nakamura et al. ....... 428/831.2
7,211,340 B2 * 5/2007 Nolan .................... 428/831.2
7,235,314 B2 * 6/2007 Chen et al. ................ 428/831

FOREIGN PATENT DOCUMENTS

JP 2004-134041 4/2004

OTHER PUBLICATIONS

MAchine translation of JP 2004-134041, Tamai et al., Japan, Apr. 2004.*

* cited by examiner

*Primary Examiner*—Holly Rickman
(74) *Attorney, Agent, or Firm*—Townsend and Townsend and Crew LLP; Darren Gold

(57) ABSTRACT

Embodiments of the invention provide a perpendicular magnetic recording medium that not only attains the magnetic isolation of crystal grains in a magnetic recording layer from one another in a region of the medium in which the thickness of an intermediate layer is equal to or smaller than about 20 nm but also exhibits excellent crystallographic texture and that exhibits small medium noise, excellent thermal stability, and high write-ability. In one embodiment, a perpendicular magnetic recording medium has at least a soft-magnetic underlayer, a first intermediate layer, a second intermediate layer, a third intermediate layer, and a magnetic recording layer successively formed on a substrate. The magnetic recording layer is composed of ferromagnetic crystal grains and oxides or nitrides, the third intermediate layer is composed of Ru or an Ru alloy, the second intermediate layer is composed of a metal or an alloy having the face-centered cubic lattice structure, and the first intermediate layer is composed of a metal or an alloy having the hexagonal close-packed structure.

19 Claims, 12 Drawing Sheets

(a)

(b)

Ti first intermediate layer (14) thickness (nm)

Ti first intermediate layer (14) thickness (nm)

PERPENDICULAR MAGNETIC RECORDING MEDIA AND MAGNETIC STORAGE APPARATUS USING THE SAME

CROSS-REFERENCES TO RELATED APPLICATIONS

This application claims priority from Japanese Patent Application No. JP2003-427706, filed Dec. 24, 2003, the entire disclosure of which is incorporated herein by reference.

BACKGROUND OF THE INVENTION

The present invention relates to a perpendicular magnetic recording medium and a magnetic storage apparatus capable of recording a large amount of information.

According to a longitudinal magnetic recording system adapted to existing magnetic disk units, for improvement of a linear recording density, it is necessary to reduce a demagnetizing field in a recorded bit by decreasing the product of a remanent magnetization of a magnetic film as a recording medium and the thickness of the magnetic film. Moreover, the coercivity of the magnetic film must be increased. However, as the coercivity of a magnetic recording layer is increased, the ability of a recording head to write data becomes insufficient. Moreover, for reduction in a medium noise, it is necessary to reduce the sizes of crystal grains and the grain size distribution. However, such a medium having the sizes of ferromagnetic crystal grains thereof reduced poses a problem in that recorded information may be lost due to thermal fluctuation. This makes it hard to improve the recording density according to the longitudinal magnetic recording system.

For solution of the foregoing problems, a perpendicular magnetic recording system is widely recognized. The perpendicular magnetic recording system is a system of forming recorded bits so that a recording medium will be magnetized perpendicularly to the surface of the recording medium and the magnetization directions in adjacent recorded bits will be anti-parallel to each other. Compared with the longitudinal recording system, a demagnetizing field at a magnetic transition region is small. Therefore, a medium noise can be reduced, and at high recording densities a recorded magnetization can be held stable.

As a magnetic recording layer (magnetic layer) included in a perpendicular magnetic recording medium, adoption of a Co—Cr—Pt alloy film that is adapted to longitudinal magnetic recording media, or adoption of a multilayer film having numerous Co and Pt layers alternately formed has been discussed. For reduction in a medium noise caused by the medium whose recording layer composed of the Co—Cr—Pt alloy film or multilayer film, and for improvement in thermal decay of recorded magnetization, it is important to reduce the crystal grain sizes of the recording layer, reduce the grain size distribution, and reduce the intergranular exchange coupling.

When the Co—Cr—Pt alloy film is adopted as a magnetic recording layer, the c-axes of the hexagonal close-packed (hcp) structures are aligned perpendicularly to the surface of the film. The longitudinal crystal orientation is only a little different between adjacent crystal grains. Therefore, the segregation of Cr to grain boundaries hardly takes place. This results in insufficient magnetic decoupling of crystal grains or an increase in crystal grain size due to coalescence of crystal grains in the course of crystal growth. Consequently, it is hard to reduce medium noise.

In efforts to solve the above problem, a proposal has been made of a magnetic recording medium structured so that ferromagnetic crystal grains will be enclosed with non-magnetic compounds such as oxides or nitrides. The thus-structured magnetic recording medium (or magnetic recording layer) is referred to as a granular medium (or granular magnetic recording layer). For example, Japanese Unexamined Patent Application Publication No. 2002-342908 has disclosed a medium having Si oxides, which contain silicon by an atomic percent equal to or larger than 8 and equal to or smaller than 16, added to a Co—Cr—Pt alloy. When a large quantity of oxides is added, the c-axis orientation of crystal grains in a magnetic recording layer may be degraded or the oxides may be mixed not only in grain boundaries but also in ferromagnetic crystal grains. This poses a problem in that a coercivity, a squareness ratio, a signal-to-noise ratio, and a resolution decrease.

In order to solve the above problem, it is supposedly important to control the crystal growth of a magnetic recording layer using an underlayer or an intermediate layer. For example, "High Performance CoPtCrO Single Layered Perpendicular Media with No Recording Demagnetization" (IEEE Transactions on Magnetics, Vol. 36, No. 5, September 2000, pp. 2393-2395) has disclosed a single-layer perpendicular medium having a CoPtCrO magnetic layer formed on an Ru underlayer. The thickness of an Ru intermediate layer is equal to or larger than about 40 nm, whereby the c-axis orientation of ferromagnetic grains improves. Consequently, the magnetic properties and recording performances of the magnetic recording layer improve.

Moreover, Japanese Unexamined Patent Application Publication No. 6-76260 has disclosed a structure that has an intermediate layer, which is composed of a metal or an alloy having the face-centered cubic (fcc) lattice structure, formed on a Ti underlayer, and that has a CoPtBO granular magnetic recording layer formed on the intermediate layer. Since the intermediate layer made of a metal or an alloy having the fcc lattice structure is formed on the Ti underlayer, the structure exhibits high magnetic anisotropy within a wide range of concentrations of oxygen to be added to the CoPtBo granular magnetic layer. This results in an improved squareness ratio. Nevertheless, the squareness ratio is smaller than 0.5 and insufficient. Furthermore, the intermediate layer composed of a metal or an alloy having the fcc lattice structure is as thick as 100 nm. If the structure is adapted to a double-layer perpendicular medium, there is a fear of degradations in write-ability and a recording resolution.

In a double-layer perpendicular magnetic recording medium having a soft-magnetic underlayer formed under a magnetic recording layer, a non-magnetic layer (intermediate layer) interposed between the magnetic recording layer and soft-magnetic layer causes a spacing loss during recording. In order to prevent degradations of write-ability and a recording resolution, the intermediate layer for controlling the crystal growth of the magnetic recording layer must be thinned.

As an example of a magnetic recording medium having a thin non-magnetic intermediate layer, Japanese Unexamined Patent Application Publication No. 2003-77122 has disclosed a structure comprising a CoCrPt—SiO2 granular magnetic layer, a non-magnetic underlayer that is composed of a metal or an alloy having the hexagonal close-packed (hcp) structure and that is formed under the magnetic layer, a seed layer that is composed of a metal or an alloy having the face-centered cubic (fcc) lattice structure and that is formed under the non-magnetic underlayer, and a non-magnetic orientation control layer that is composed of a metal or an alloy having the body-centered cubit (bcc) lattice structure or the amorphous structure and that is formed under the seed layer. The (0002) planes of the non-magnetic underlayer having the hcp structure are epitaxially grown on the seed layer with the fcc (111) texture, whereby the crystallographic texture is improved. Consequently, excellent magnetic properties are attained despite a thin intermediate layer whose thickness is equal to or smaller than 20 nm. In this case, the thickness of the seed layer composed of the metal having the fcc lattice structure must be equal to or larger than 3 nm, or more preferably, equal to or larger than 5 nm for the purpose of improving the crystallographic texture. Moreover, Japanese Unexamined Patent Application Publication No. 2003-178412 describes that when the non-magnetic underlayer included in the above structure is composed of a Ru-based alloy capable of establishing good lattice matching with the magnetic recording layer by adding at least one material of C, Cu, W, Mo, Cr, Ir, Pt, Re, Rh, Ta, or V to Ru, even if the thickness of the intermediate layer is equal to or smaller than 20 nm, the crystal grain sizes of the magnetic recording layer can be reduced and its initial growth layer can be reduced. Consequently, medium noise can be reduced.

Japanese Unexamined Patent Application Publication No. 2002-334424 has disclosed a Co—Cr—Pt magnetic layer, an orientation control layer that has a thickness of 5 nm, that is composed of Ru to which contains 20 atomic percent of oxides containing such as Si, Zr, Hf, Ti, or Al, or 15 atomic percent of B or C is added, and that is intended to control the orientation of the magnetic layer, and an orientation control underlayer composed of NiAl having the B2 structure and intended to control the orientation of the orientation control layer. When such a large quantity of oxides, B, or C is added to Ru, although it is intended to improve the orientation of a recording layer and reduce the grain size thereof, the crystallographic texture may be degraded. In reality, "Medium Noise and Grain Size Analysis of CoCrPt/Ti Perpendicular Media with NiAl Seed Layer" (IEEE Transactions on Magnetics, Vol. 37, No. 4, July 2001, pp. 1583-1585) reports that layering Ti, which has the hcp structure, on NiAl having the B2 structure has the merit of reducing a grain size but poses a problem in terms of the c-axis orientation.

According to the foregoing related arts, the magnetic isolation of ferromagnetic crystal grains constituting a magnetic recording layer is insufficiently attained or the crystallographic texture is unsatisfactory. For realization of a perpendicular magnetic recoding medium capable of achieving higher-density recording, it is necessary to devise a technology for producing an intermediate layer that promotes the magnetic isolation of ferromagnetic crystal grains from one another while maintaining the crystal crystallographic texture of a magnetic recording layer and thus helps reduce its noise.

When a multilayer film having Co and Pd layered is adopted as a magnetic recording layer, compared with when a Co—Cr—Pt alloy is adopted, intergranular exchange coupling of the magnetic recording layer is quite large. For high-density recording, the crystal grains constituting the multilayer film must be magnetically isolated from one another.

For example, Japanese Unexamined Patent Application Publication No. 2002-25032 has disclosed that B and O are contained in a recording layer in order to magnetically isolate crystal grains, which constitute a magnetic recording layer, from one another. Moreover, Japanese Unexamined Patent Application Publication No. 2002-304715 has disclosed the following: N and O are contained in a magnetic recording layer consisting of a multilayer film and an underlayer containing at least Pd and Si is employed, whereby crystal growth in the multilayered structure and reduction in intergranular exchange coupling are realized. Discussion of an intermediate layer and a seed layer adaptable to the multilayer film is made in "Perpendicular magnetic recording thin film media using Co/Pd superlattice on ultrathin indium-tin-oxide seed layers" (Journal of Applied Physics, Vol. 87, No. 9, May 2000, pp. 6358-6560) that has disclosed a structure that Pd is formed on an indium-tin-oxide (ITO) layer. Moreover, "Co/Pd multilayer media with Pd inorganic granular seed layer for perpendicular recording" (Journal of Applied Physics, Vol. 91, No. 10, May 2002, pp. 8073-8075) has disclosed a structure using PdSiN. In a Co/Pd multilayer medium, perpendicular magnetic anisotropy is attributed to the structure of the interface between a Co layer and a Pd layer. In case of the Co/Pd multilayer medium, the magnetic properties are less sensitive to the crystallographic texture than in the case of a CoCr-based alloy medium thereof. The related arts have put emphasis on reducing intergranular exchange coupling of a magnetic recording layer, and are therefore not satisfactory in terms of crystallographic texture. However, the magnitude of magnetic anisotropy of a multilayer medium varies depending on crystallographic texture. Improving the crystallographic texture for reducing a distribution of the magnitude of magnetic anisotropy is presumably important for improvement of thermal stability and recording performance.

BRIEF SUMMARY OF THE INVENTION

In a double-layer perpendicular magnetic recording medium suitable for high-density recording, for further improvement of a recording density, it is necessary to control the crystallographic texture of crystal grains in a magnetic recording layer and magnetic decoupling thereof in a region of the intermediate layer thickness which is equal to or smaller than 20 nm. However, for example, when a CoCrPt—SiO2 granular magnetic layer is adopted as the magnetic recording layer, if the thickness of the Ru intermediate layer is decreased, a phenomenon described below is known to take place. Namely, the crystallographic texture is degraded, and the magnetic isolation of crystal grains from one another tends to be hindered. According to the related arts, improvements have been made, that is, the crystallographic texture of a magnetic recording layer has been improved and an initial growth layer exhibiting small magnetic anisotropy has been reduced. However, the magnetic decoupling of crystal grains has unsatisfactorily been achieved. The present inventors observed the surface morphology of a thick Ru intermediate layer and a thin Ru intermediate layer using atomic force microscopy in pursuit of the cause of hindering the magnetic decoupling of crystal grains in a magnetic recording layer. Eventually, the present inventors discovered that the surface roughness of Ru rapidly decreases along with a decrease in the thickness thereof. The magnetic decoupling of crystal grains in the magnetic recording layer presumably originates in the irregularities of the Ru surface and occurs because CoCrPt or any other ferromagnetic grains and SiO2 or any other oxide segregate and surround them. In other words, the present inventors discovered that a problem arises in which thinning the Ru intermediate layer causes the surface roughness to decrease. Moreover, since Ru is an expensive material, the minimization of the Ru thickness greatly contributes to reduction in the cost of manufacture.

Embodiments of the present invention provide a perpendicular magnetic recording medium that exhibits small medium noise, excellent thermal stability, high write-ability, and high resolution, resulting from establishing not only the magnetic isolation of ferromagnetic crystal grains, which constitute a magnetic recording layer, from one another but also excellent crystallographic texture of the magnetic recording layer even when an Ru intermediate layer is thin, by means of both increasing the surface roughness of the Ru layer and improving the crystallographic texture of the Ru intermediate layer when the Ru intermediate layer is thin.

According to one feature of the present invention, there is provided a perpendicular magnetic recording medium having at least a soft-magnetic underlayer, a first intermediate layer, a second intermediate layer, a third intermediate layer, and a magnetic recording layer successively formed on a substrate. Herein, the magnetic recording layer is composed of ferromagnetic crystal grains and oxides or nitrides. The third intermediate layer is composed of Ru or an Ru alloy. The second intermediate layer is composed of a metal or an alloy having the face-centered cubic (fcc) lattice structure. The first intermediate later is composed of a metal or an alloy having the hexagonal close-packed (hcp) structure.

The second intermediate layer composed of a metal or an alloy having the fcc lattice structure is formed on the first intermediate layer composed of a metal or an alloy having the hcp structure. Roughness with narrow mean spacing of roughness profile, which results from the island structure is formed during the early stages of its growth. This is presumably because the difference between the surface energy of the metal or alloy having the hcp structure and the surface energy of the metal or alloy having the fcc lattice structure is larger than interfacial free energy. Thus, the three-dimensional island growth occurs. When an Ru layer or an Ru alloy layer is formed on the roughness, the surface roughness of the Ru or Ru alloy layer is increased and formation of grain boundaries is promoted. Therefore, even when the thickness of the Ru or Ru alloy layer is decreased, enough surface roughness to magnetically isolate crystal grains, which constitute the magnetic recording layer, from one another is attained. Moreover, the (111) planes of the second intermediate layer with the fcc structure are epitaxially grown on the (0002) planes of the first intermediate layer with the hcp structure. Furthermore, the (0002) planes of the third intermediate layer composed of Ru or an Ru alloy are epitaxially grown on the (111) planes of the second intermediate layer. Consequently, the crystallographic texture of the Ru or Ru alloy and the crystallographic texture of the magnetic recording layer are improved.

In other words, the second intermediate layer composed of the metal or alloy having the fcc lattice structure is thinly formed on the first intermediate layer composed of the metal or alloy having the hcp structure, and the third intermediate layer composed of Ru or an Ru alloy is formed on the second intermediate layer. Consequently, even when the third intermediate layer composed of Ru or an Ru alloy is thin, enough surface roughness is attained without degrading the crystallographic texture of the Ru or Ru alloy layer. Eventually, the crystallographic texture of the magnetic recording layer is improved and the magnetic isolation of the crystal grains from one another is promoted, resulting in excellent magnetic properties and excellent recording and reproducing performances. The advantages such as improvement in the crystallographic texture of the magnetic recording layer and promotion of the magnetic isolation thereof can be achieved irrespective of the thickness of the Ru or Ru alloy layer. However, when it is taken into account that write-ability and resolution must not be degraded and the costs of materials must not be increased, the thickness of the Ru or Ru alloy layer should preferably be smaller than about 20 nm.

For formation of a granular magnetic recording layer, a low-temperature process is normally adopted for the purpose to suppress the reaction between Co and Si oxide or any other oxide. When adaptability to the low-temperature process is taken into account, any material whose melting point is relatively low and which tends to form the surface roughness easily even at low temperature, such as, Al, Ag, Au, Cu, Ni, or Pd or an alloy containing as a main component at least one of Al, Ag, Au, Cu, Ni, and Pd is preferred as the material to constitute the second intermediate layer. Consequently, even when the thickness of the Ru or Ru alloy layer is decreased, enough surface roughness to magnetically isolate crystal grains, which constitute the magnetic recording layer, from one another can be attained while the adaptability to the low-temperature process is maintained.

Preferably, the first intermediate layer is composed of any of the metals of Ti, Zr, and Hf or an alloy containing as a main component at least one of Ti, Zr, and Hf. The interfacial interaction of these materials with the metal or alloy having the fcc lattice structure and constituting the second intermediate layer is so intense that the materials exhibit excellent wettability and a strong (111) texture. Moreover, the intense interfacial interaction suppresses migration and coalescence of islands during three-dimensional island growth in the early stage of crystal growth. Consequently, the density of islands increases and the lateral size of each island decreases. Eventually, the sizes of the crystal grains of the third intermediate layer grown on the islands are reduced.

Moreover, the average thickness of the second intermediate layer employed in the present embodiment is required to be equal to or larger than about 0.2 nm and equal to or smaller than about 3 nm. Preferably, the average thickness is equal to or larger than about 0.4 nm and equal to or smaller than about 2 nm. When the average thickness falls within the above range, large enough surface roughness with narrow mean spacing between peaks (islands whose lateral sizes are small) can be produced by utilizing the island structure of the second intermediate layer observed only in the early stage of thin film growth. Consequently, the sizes of the crystal grains in the third intermediate layer formed on the second intermediate layer can be reduced, the surface roughness can be increased, and formation of grain boundaries can be promoted. Consequently, the magnetic decoupling of crystal grains constituting the magnetic recording layer can be promoted.

When the average thickness is smaller than about 0.2 nm, the surface roughness of the second intermediate layer is not sufficient. Consequently, the surface roughness of the Ru or Ru alloy layer formed on the second intermediate layer is degraded, and the grain boundaries thereof are unclear. Therefore, the magnetic decoupling of the crystal grains in the magnetic recording layer from one another is attained insufficiently.

On the other hand, when the average thickness is larger than about 30 nm, the islands in the second intermediate layer coalesce to drastically increase the grain size (mean spacing of profile irregularities). On the second intermediate layer whose crystal grains have the fcc lattice structure and exhibit a (111) texture, the longitudinal crystal orientations of Ru or Ru-alloy crystal grains are likely to align with one another, and the crystal grains are likely to coalesce together in the course of growth. Therefore, as the grain size of the second intermediate layer increases, the grain size of the Ru or Ru alloy intermediate layer increases. Consequently, the grain boundaries in the magnetic recording layer mainly reflect the large grain size of the second intermediate layer. This induces the increase in the grain size of the magnetic recording layer and is undesired. Moreover, the non-magnetic intermediate layer between the magnetic recording layer and soft-magnetic underlayer causes a loss during recording and must therefore be as thin as possible within a range permitting to form enough surface roughness.

Furthermore, when the surface of any of the metals of Ti, Zr, and Hf that constitute the first intermediate layer or an alloy containing at least one of Ti, Zr, and Hf is exposed to an atmosphere of an argon-oxygen mixed gas, the surface of the first intermediate layer is oxidized partly. Consequently, the grain size of the second intermediate layer is reduced and the surface roughness thereof is increased. The reason presumably is that since the metal or alloy having the fcc lattice structure and constituting the second intermediate layer exhibits good wettability on any of the metals of Ti, Zr, and Hf or an alloy based on any of the metals but exhibits poor wettability on oxides, the crystals of the metal or alloy selectively grow in a region in which the surface of the metal or alloy is not oxidized, and accordingly the growth in a longitudinal direction is suppressed. If the surface of the metal or alloy is fully coated with oxides, on whatever place the crystals thereof grow, the interfacial energies thereof are equal to one another. Therefore, the above effect is not obtained. The degradation in orientation and the decrease in a squareness ratio induce degradation of recording performances. This is undesirable.

When a Ru alloy layer containing at least one of oxides or nitrides is adopted as the third intermediate layer formed on the surface roughness caused by the second intermediate layer, the oxides or nitrides segregates to the grain boundaries in the third intermediate layer. Consequently, the grain boundaries are clearly produced without degrading the crystallographic texture. On the grain boundaries composed of the oxides or nitrides, grain boundaries, which are composed of oxides or nitrides, of the magnetic recording layer are formed. While degradation in the crystallographic texture is suppressed, magnetic isolation of ferromagnetic crystal grains from one another can be promoted. In this case, if Ru or an Ru alloy were sputtered in an atmosphere containing oxygen or nitrogen, the same effect would be obtained. Preferably, an element to be added to Ru should contain Si or B.

The thickness of the first intermediate layer should be large enough to fully cover the soft-magnetic underlayer so that the islands, which wet on the first intermediate layer, can be formed during the growth of second intermediate layer, and to control the crystallographic texture of the magnetic recording layer via the second and third intermediate layers. For example, if the thickness of the first intermediate layer is equal to or larger than about 2 nm, the conditions can be fully met. However, as far as a double-layer perpendicular medium is concerned, if the distance between the magnetic recording layer and soft-magnetic underlayer gets larger, degradations in write-ability and resolution are induced. Therefore, preferably, the thickness of the first intermediate layer should be as small as possible within a range permitting control of crystallographic texture.

Moreover, a Ta layer may be interposed between the soft-magnetic underlayer and first intermediate layer in order to reduce the thickness of the first intermediate layer down to about 1 nm. Even in this case, strong c-axis orientation can be attained. The thickness of the Ta layer should be large enough to fully cover the soft-magnetic underlayer.

The magnetic recording layer employed in the present embodiment is a granular magnetic recording layer composed of ferromagnetic crystal grains and grain boundaries that are composed of oxides or nitrides and that enclose the crystal grains. A material composed of ferromagnetic crystal grains is not limited to any specific one. A Co—Cr—Pt medium or an multilayer medium having Co and Pd or Pt alternately layered may be adopted. On the other hand, as a material constituting non-magnetic grain boundaries, any of Si, Co, Cr, Ti, Al, and Zr oxides or nitrides can be adopted.

According to embodiments of the present invention, excellent crystallographic texture and magnetic isolation can be attained even in a region in which the thickness of an intermediate layer is equal to or smaller than about 20 nm. Consequently, a perpendicular magnetic recording medium unsusceptible to thermal fluctuations and characteristic of small medium noise and excellent write-ability can be provided.

BRIEF DESCRIPTION OF THE DRAWINGS

FIG. 16(a) shows the cross-sectional image of the structure of the sixth embodiment, and FIG. 16(b) shows the cross-sectional image of the structure of the comparative example 6-1.

DETAILED DESCRIPTION OF THE INVENTION

Embodiments of the present invention will be presented and described with reference to drawings below.

First Embodiment

A perpendicular magnetic recording medium in accordance with the first embodiment is produced using sputtering equipment (C-3010) manufactured by Anelva Corp. The sputtering equipment comprises ten process chambers and one substrate loading/unloading chamber. The chambers are mutually independently pumped. After all the process chambers are pumped down to a vacuum of $1\times10^{-5}$ Pa or less, a carrier on which a substrate is placed is moved to each of the process chambers so that the substrate will successively undergo processes. A rotary magnet type magnetron sputter cathode is incorporated in a sputtering process chamber. A metal and carbon are produced through DC sputtering, and an oxide film is produced through RF sputtering. Moreover, special cathodes called rotating cathodes are incorporated in one sputtering process chamber. The three rotating cathodes whose power can be controlled mutually independently are revolved in front of a substrate, whereby a multilayer film or an alloy can be produced readily. Moreover, RF sputtering can be performed. Therefore, a granular structure composed of a metal and an oxide can be produced readily. The ratio of the components can be continuously varied.

Figure 1:
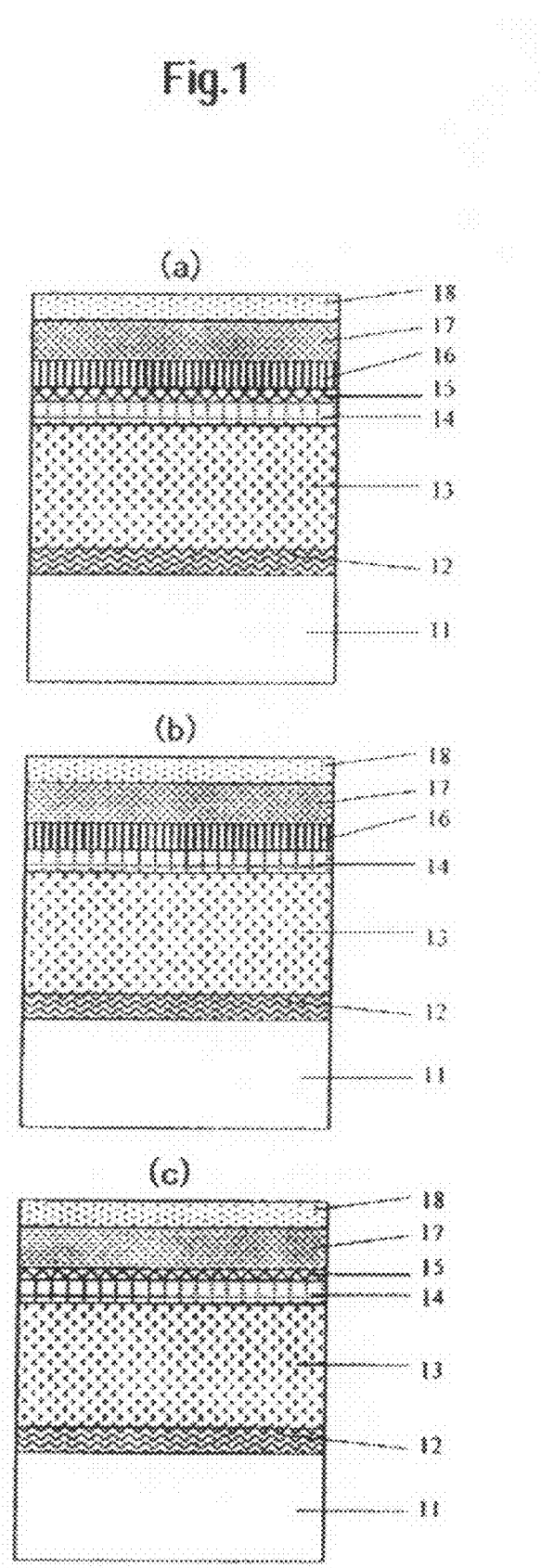
FIG. 1 illustratively shows the cross-sectional structure of an embodiment of a perpendicular magnetic recording medium in accordance with the present invention, and also illustratively shows the cross-sectional structures of comparative examples.

FIG. 1(a) illustratively shows the sectional structure of an embodiment of a perpendicular magnetic recording medium in accordance with the present invention. A procedure of producing the medium will be described below. A glass substrate having a diameter of about 63.5 mm is adopted as a substrate 11.

To begin with, a seed layer 12 of about 30 nm thick is formed on the substrate 11 using a Ni-37.5 at. % Ta-10 at. % Zr alloy in efforts to intensify the close contact with the substrate. Thereafter, a soft-magnetic underlayer 13 is formed by successively layering a Ni-20 at. % Fe alloy of about 5 nm thick, an Mn-20 at. % Ir alloy of about 8 nm thick, an Ni-20 at. % Fe alloy of about 5 nm thick, and a Co-3 at. % Ta-5 at. % Zr alloy of about 200 nm thick. This structure contributes to reduction in medium noise caused by the soft-magnetic underlayer.

Thereafter, a first intermediate layer 14 of about 4 nm thick composed of Ti, a second intermediate layer 15 whose average thickness is varied within a range from about 0.1 nm to 10 nm, and a third intermediate layer 16 of about 10 nm thick composed of Ru are formed successively. As the second intermediate layer 15, Al, Cu, or Pd is adopted. Incidentally, a medium using Al as the second intermediate layer was produced as an example 1-1, a medium using Cu as the second intermediate layer was produced as an example 1-2, and a medium using Pd as the second intermediate layer was produced as an example 1-3.

A magnetic recording layer 17 composed of a CoCrPt alloy and a Si oxide and a carbon protective layer 18 of about 4 nm thick are formed successively. After formation of the carbon protective film is completed, the medium is removed from the sputtering chamber. An organic lubricant is applied to the surface of the medium, whereby a lubricant layer is formed. The thicknesses of the layers are average thicknesses and adjusted depending on a sputtering time and supply power. An argon gas is adopted as a sputtering gas. For formation of the third intermediate layer 16 composed of Ru, the pressure of the sputtering gas is set to 2 Pa. For formation of the magnetic recording layer 17, the pressure of the sputtering gas is set to 4 Pa. For the other purposes, the pressure of the sputtering gas is set to 1 Pa. Moreover, for formation of the magnetic recording layer 17, an argon-oxygen mixed gas made by mixing 0.35% of oxygen in argon is employed. For formation of the magnetic recording layer 17, the rotating cathodes are employed. The rotating cathodes to which a target composed of a Co-17 at. % Cr-14 at. % Pt alloy and a target composed of SiO2 are attached are simultaneously discharged by performing DC sputtering and RF sputtering respectively. Power to be supplied to the cathodes is adjusted so that the amount concentration of SiO2 in the magnetic recording layer will be 18 vol. %.

As samples to be compared with the first example, media having intermediate layers described below were produced. Namely, a medium including a first intermediate layer 14 of 4 nm thick composed of Ti, a third intermediate layer 16 composed of Ru, and being devoid of a second intermediate layer 15 was produced as a comparative example 1-1. FIG. 1(b) shows the structure of the medium of the comparative example 1-1. A medium having the same layered structure as the first embodiment and including a second intermediate layer 15 composed of Ta that has the body-centered cubic (bcc) lattice structure was produced as a comparative example 1-2. A medium having the same layered structure as the first embodiment and including a second intermediate layer 15 composed of Ni-37.5 at. % Ta-10 at. % Zr which has an amorphous structure was produced as a comparative example 1-3. Herein, films other than the intermediate layers and the conditions for a process are identical to those adapted to the first embodiment.

Magnetic properties were measured at room temperature using Kerr effect measuring equipment. A magnetic field was applied perpendicularly to the film plane. A maximum magnetic field was set to 1751 kA/m (22 kOe). Kerr rotation angles based on which a Kerr loop was plotted were measured during 64 sec. with a sweep rate held constant. After the slope of the Kerr loop derived from a soft-magnetic underlayer was corrected, a coercivity and a squareness ratio were calculated. For evaluation of recording performances using a spin stand, a composite magnetic head including a reading head utilized the giant magnetoresistance effect with a shield-gap width of 62 nm and a track width of 120 nm, and a single-magnetic pole writing head with a track width of 150 nm was employed. Under the conditions that a relative velocity between the head and medium was 10 m/s, a skew angle was 0°, and a magnetic spacing was approximately 15 nm, an output signal and medium noise were measured. A medium signal-to-noise ratio (medium SNR) was evaluated based on a ratio of an isolated output signal at a linear recording density of 1969 fr/mm (50 kFCI) to medium noise at a linear recording density of 15748 fr/mm (400 kFCI). Moreover, a resolution was evaluated based on a ratio of a output signal at a linear recording density of 15748 fr/mm (400 kFCI) to an output signal at a linear recording density of 1969 fr/mm (50 kFCI).

Figure 2:
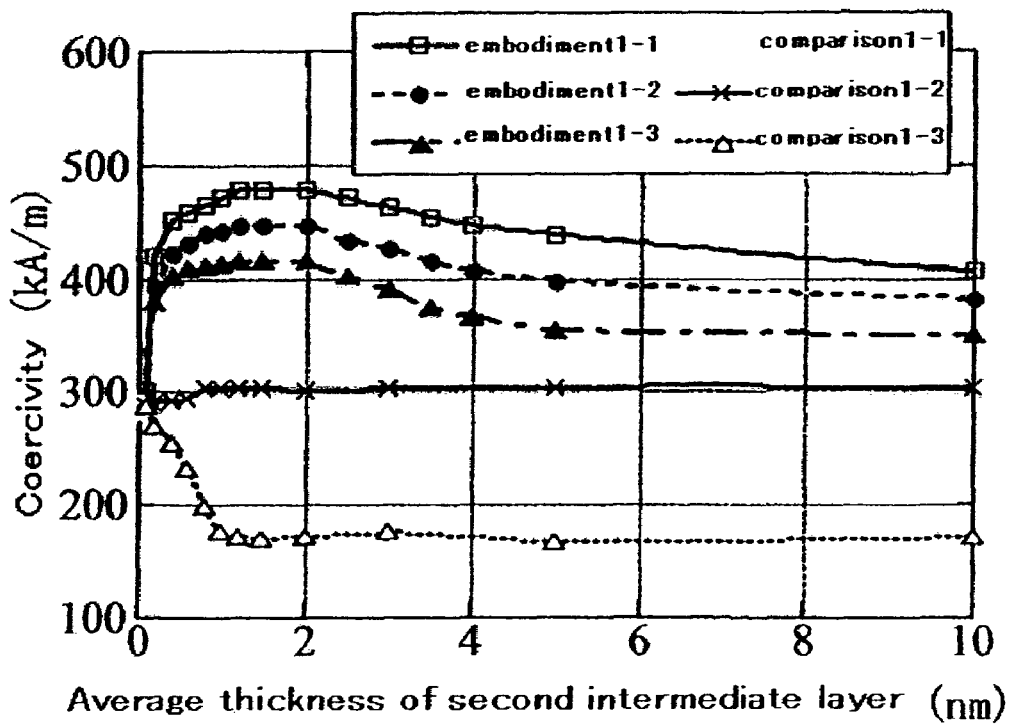
FIG. 2 shows the dependence of the coercivity of examples 1-1 to 1-3 and comparative examples 1-1 to 1-3, on the average thicknesses of second intermediate layer.
Figure 3:
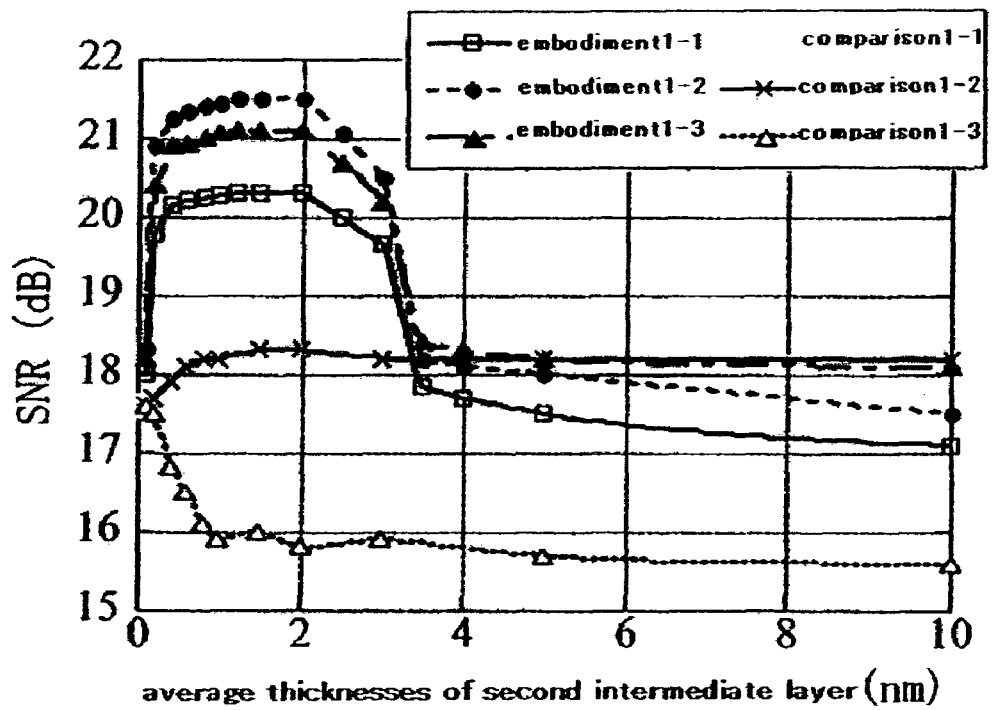
FIG. 3 shows the dependence of the signal-to-noise ratio of the examples 1-1 to 1-3 and comparative examples 1-1 to 1-3 on the average thicknesses of the second intermediate layer.

FIG. 2 and FIG. 3 show the dependence of the coercivity and signal-to-noise ratio (SNR) of the aforesaid media on the average thicknesses of the second intermediate layers. In the comparative example 1-2 using Ta, which has the bcc lattice structure, as the second intermediate layer thereof, the coercivity and SNR increase a bit along with an increase in the average thickness of the second intermediate layer. The effect of promoting separation of grains along grain boundaries is hardly observed. Moreover, in the comparative example 1-3 using Ni-37.5 at. % Ta-10 at. % Zr which has an amorphous structure, as the second intermediate layer thereof, the coercivity and SNR decreases along with an increase in the average thickness of the second intermediate layer.

In the case of the example 1-2 using Cu, which has the fcc lattice structure, as the second intermediate layer thereof, when the average thickness of the second intermediate layer is equal to or larger than 0.2 nm, the coercivity increases drastically. The signal-to-noise ratio increases accordingly. When the average thickness of Cu is equal to or larger than about 0.4 nm and equal to or smaller than about 2 nm, both the coercivity and signal-to-noise ratio increase gradually. When the average thickness ranges from about 1.2 nm to 2 nm, the coercivity and signal-to-noise ratio are maximized. When the average thickness of Cu ranges from about 2 nm to 3 nm, the coercivity and signal-to-noire ratio turn to decrease a bit but are still high enough. However, when the average thickness of Cu exceeds 3 nm, the signal-to-noise ratio drastically decreases.

In the cases of the example 1-1 adopting Al and the example 1-3 adopting Pd, when the average thickness is equal to or larger than about 0.2 nm and equal to smaller than about 3 nm, a high coercivity and a high signal-to-noise ratio are observed. This is presumably because when any of the metals of Cu, Al, and Pd having the fcc lattice structure is adopted for the second intermediate layer, magnetic isolation of crystal grains in the magnetic recording layer from one another is promoted.

In the cases of the example 1-2 and comparative example 1-1, the magnetic recording layer and successive layers were not formed but the medium was removed from the sputtering chamber. The surface morphology of the Ru third intermediate layer was observed using an atomic force microscope, whereby an average surface roughness Ra and a mean spacing of profile irregularities were calculated. Table 1 lists the results of the calculation. The mean spacing of profile irregularities presumably corresponds to an average grain size of the Ru third intermediate layer.

TABLE 1

| Average thickness of Cu second intermediate layer (nm) | Ra of Ru third intermediate layer (nm) | Grain size of Ru third intermediate layer (nm) |
| --- | --- | --- |
| 0 | 0.27 | 8 |
| 0.1 | 0.28 | 8 |
| 0.8 | 0.40 | 8.5 |
| 5 | 0.45 | 18.5 (large variance) |

Figure 4:
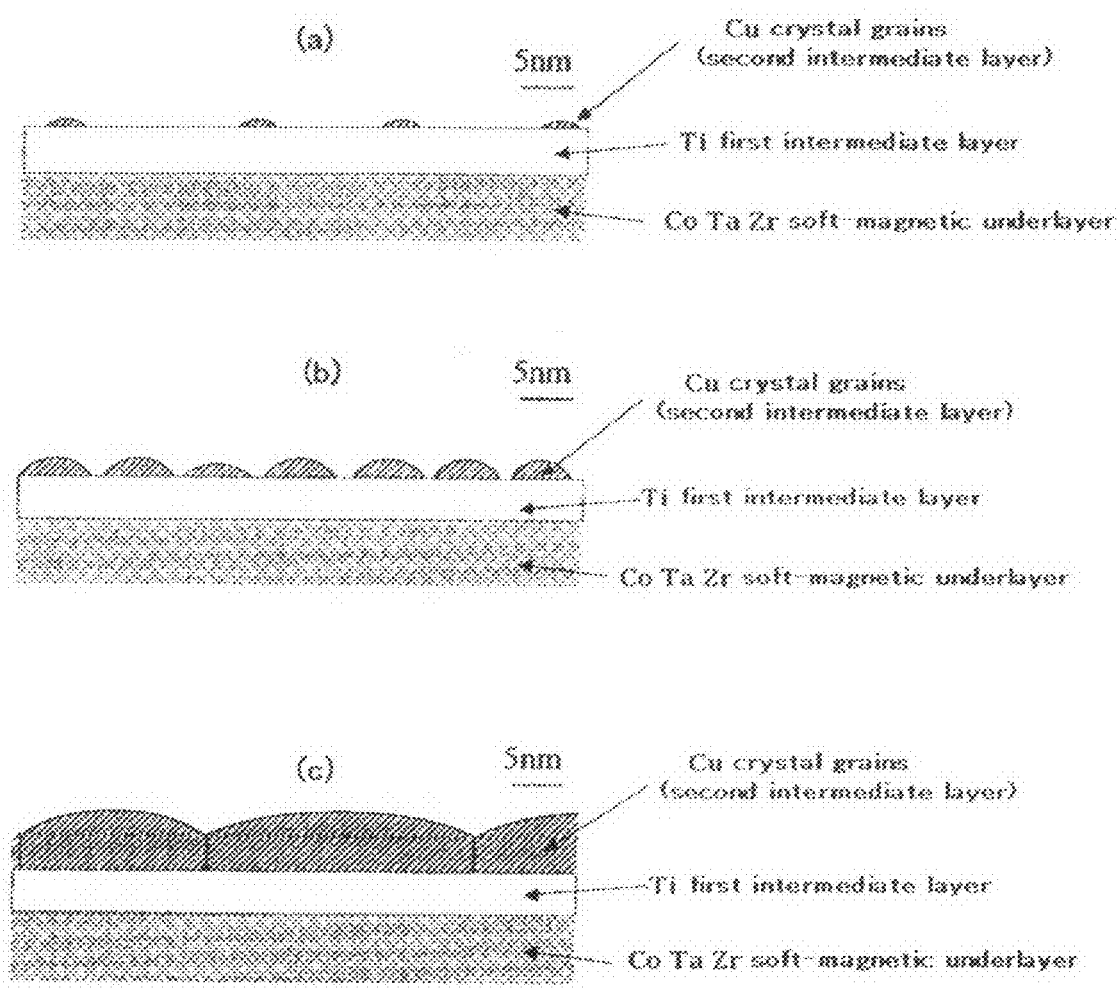
FIG. 4 illustratively shows the variations of a cross-sectional structure depending on the average thickness of a Cu second intermediate layer formed on a Ti first intermediate layer.

FIG. 4 illustratively shows a variation of a cross-sectional structure of a medium due to a difference in the average thickness of a Cu second intermediate layer in a case where the Cu second intermediate layer is formed on a Ti first intermediate layer. According to the present embodiment, the average thickness of the second intermediate layer (Cu) is defined as described below. To begin with, the cross-sectional structure of a medium is observed using a high-resolution transmission electron microscope in order to measure the cross-sectional area of the second intermediate layer interposed between the first and third intermediate layers. Thereafter, the length of a boundary line along which the first intermediate layer is abutted on the second or third intermediate layer is measured within the observed region. A quotient of the cross-sectional area of the second intermediate layer by the length of the boundary line is regarded as the average thickness of the second intermediate layer. Herein, the observed region is determined so that the length of the boundary line will be about 50 nm or more.

Table 1 demonstrates that when the average thickness of Cu is equal to or smaller than about 0.1 nm, the average surface roughness Ra of the Ru third intermediate layer is small This is presumably because the distribution density of Cu crystal grains is low as shown in FIG. 4(a), the height of the crystal grains relative to the surface of the first intermediate layer is small, and the surface roughness of the Ru third intermediate layer grown on the second intermediate layer is therefore as small as the one attained in a medium devoid of the Cu second intermediate layer. Consequently, the magnetic decoupling of crystal grains in the magnetic recording layer from one another is rather hindered. Therefore, presumably, the coercivity is small and the signal-to-noise ratio is low.

When the average thickness of Cu is set to 0.8 nm, the surface roughness of the Ru third intermediate layer is increased and the average grain size (mean spacing of profile irregularities) is as small as about 8.5 nm. This is presumably because, as shown in FIG. 4(b), the distribution density of Cu crystal grains gets higher and the crystal grains grow to have a large enough height with respect to the surface of the first intermediate layer. Consequently, roughness with short mean spacing between peaks and large enough surface roughness are formed at the Ru surface as the Ru crystal grains grow according to the surface roughness (island structure) of the Cu crystal grains. The surface roughness promotes reduction in the grain size and the magnetic decoupling of grains from one another. This may lead to an improved signal-to-noise ratio.

On the other hand, when the average thickness of Cu is as large as 5 nm, the surface roughness of the Ru third intermediate layer is more intense. Moreover, the grain size (mean spacing of profile irregularities) is drastically increased to be as large as about 18.5 nm. Numerous crystal grains have diameters of about 30 nm or more. Namely, the variance from the average grain size is very large. This is presumably because, as shown in FIG. 4(c), when the average thickness of Cu increases to be as large as about 5 nm, the Cu crystal grains grown in island growth mode coalesce with others. Consequently, the diameters of the Cu crystal grains and the variance from the average grain size increase drastically. Since the grains of the Ru third intermediate layer reflect the shapes of the Cu grains, the diameters of the grains and the variance from the average grain size of the Ru third intermediate layer increase accordingly. Eventually, although the magnetic decoupling of the crystal grains in the magnetic recording layer takes place, since the diameters of the grains get larger, a signal-to-noise ratio is degraded.

Figure 5:
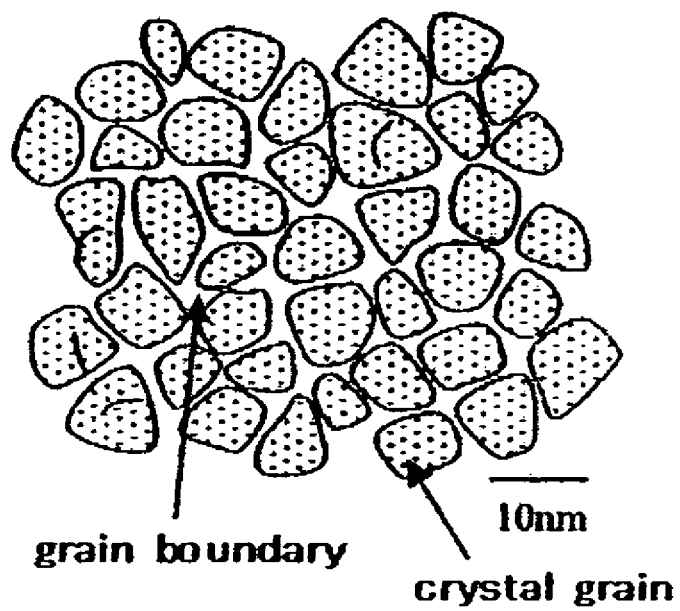
FIG. 5 illustratively shows plan-view images of the structure of a magnetic recording layer included in a perpendicular magnetic recording medium in accordance with the first embodiment which is observed using a transmission electron microscope, FIG. 5($a$) shows the plan-view structure including a Cu second intermediate layer whose average thickness is 0.8 mm, and FIG. 5($b$) shows the plan-view structure including a Cu second intermediate layer whose average thickness is 5 nm.
Figure 5:
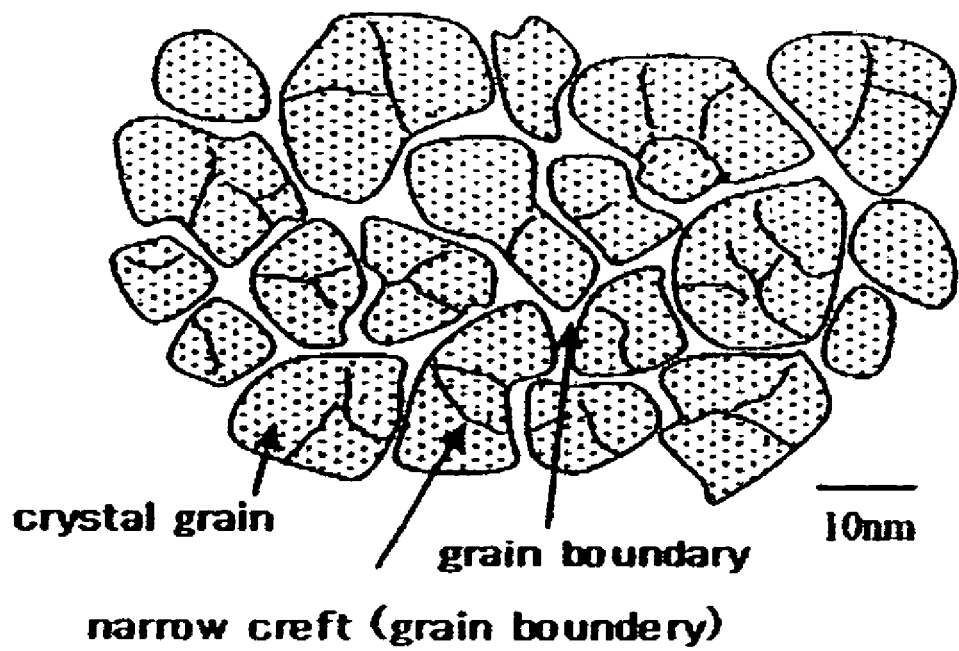

FIG. 5(a) and FIG. 5(b) show the plan-view TEM images of the magnetic recording layer of the example 1-2, of which Cu second intermediate layer has an average thickness of about 0.8 nm or 5 nm, observed using a high-resolution transmission electron microscope. Grain boundaries are identified with a light contrast region. As shown in FIG. 5(a), when the average thickness of Cu is set to 0.8 nm, CoCrPt crystal grains enclosed by wide grain boundaries of about 1 nm wide are observed. The average core size, which excludes the grain boundaries, of the CoCrPt crystal grains is about 7.5 nm. The CoCrPt crystal grains include some grains that are observed to contain thin cracks and are about to be separated. A crystal grain enclosed by a wide grain boundary is treated as one grain. As shown in FIG. 5(b), when the average thickness of Cu is set to 5 nm, CoCrPt crystal grains enclosed by wide grain boundaries of about 1 nm wide are observed (with a light contrast region). The crystal grains include numerous grains having thin cracks. The average core size of crystal grains that exclude the grain boundaries is about 17.2 mm. Since the widths of the grain boundaries are about 1 nm, the grain sizes in the magnetic recording layer reflect the surface roughness of the Ru third intermediate layer.

Based on the foregoing results, when the thickness of a metal having the fcc lattice structure and constituting the second intermediate layer is increased, the signal-to-noise ratio is degraded because the crystal grains of the metal with the fcc lattice structure coalesce with others to drastically increase the grain size, and the grain sizes of the Ru third intermediate layer and the magnetic recording layer that are formed on the second intermediate layer get drastically larger. In other words, the average thickness of the metal having the fcc lattice structure must fall within a range providing enough surface roughness to cause separation of crystal grains along grain boundaries but not causing coalescence of crystal grains that results in an increase in a grain size.

Figure 6:
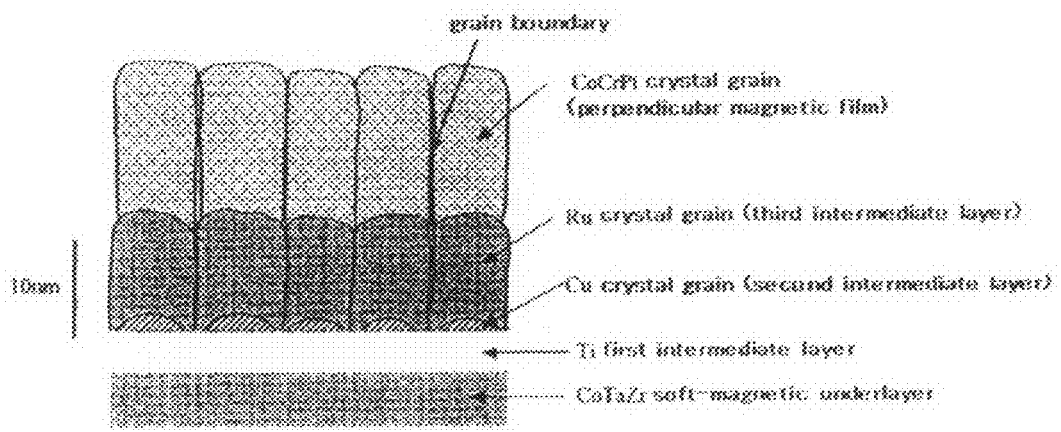
FIG. 6 illustratively shows a cross-sectional structure of the perpendicular magnetic recording medium in accordance with the first embodiment which is observed using the transmission electron microscope, wherein the average thickness of the Cu second intermediate layer is 0.8 nm.

FIG. 6 shows the cross-sectional TEM image of the medium of the example 1-2, which includes Cu having an average thickness of about 0.8 nm and offers a high signal-to-noise ratio, observed using a high-resolution transmission electron microscope. The cross section of the region in the medium to be observed is made as thin as approximately 10 nm for fear crystal grains adjoining back and forth in a direction of observation may be seen overlapping. Ti and Cu are seen as bright images because their atomic weights are smaller than that of Ru. Referring to FIG. 6, small roughness presumably attributable to the island growth of Cu grains on the interface between Ti and Ru are observed on the surface of Ti. The surface roughness of the Ru layer on the interface between Ru and the CoCrPt magnetic recording layer, which reflects the roughness formed on Ti, are observed with a small difference in a contrast.

Ru crystal grain boundaries are observed in the direction of the Ru surface with a light contrast region so that they will be aligned with the concave parts of Cu formed on Ti. On a magnetic recording layer formed on Ru, formation of grain boundaries to which SiO2 or any other non-magnetic oxide is segregated and which reflect the Ru grain boundaries is observed as a region of a light contrast. Some grain boundaries are unclear. This is presumably because the grain boundaries are formed obliquely with respect to the thickness of the sample to be observed.

Based on the foregoing results, the second intermediate layer composed of a metal having the fcc lattice structure instead of the bcc lattice structure and amorphous structure and having an average thickness that is equal to or larger than about 0.2 nm and equal to or smaller than about 3 nm, or preferably, equal to or larger than about 0.4 nm and equal to or smaller than about 2 nm is formed on the Ti first intermediate layer having the hcp structure. Consequently, roughness whose mean spacing of profile irregularities is short and whose average surface roughness is large enough is produced. Since the third intermediate layer grows on the roughness the roughness whose mean spacing of profile irregularities is short and whose average surface roughness is large enough is formed at the surface of the Ru layer. Apparently, the grain size of the magnetic recording layer is reduced and the magnetic decoupling of the crystal grains thereof from one another is promoted.

Second Embodiment

A perpendicular magnetic recording medium in accordance with the second embodiment is produced to have the same layered structure as the one of the first embodiment under the same conditions for a process using the same sputtering equipment. However, as the compositions of intermediate layers, a first intermediate layer 14 of about 4 nm thick is composed of Ti, a second intermediate layer 15 whose average thickness is about 0.8 nm is composed of Cu, and a third intermediate layer 16 whose thickness is varied within a range from about 3 nm to 15 nm is composed of Ru.

As samples to be compared with the second embodiment, three kinds of media whose internal layers have different compositions were produced. A medium having the first intermediate layer 14 of about 4 nm thick composed of Ti, having the second intermediate layer 15, of which the average thickness was about 0.8 nm, composed of Cu, and being devoid of the third intermediate layer 16 composed of Ru was produced as a comparative example 2-1. FIG. 1(c) shows the layered structure of the comparative example 2-1. A medium having the same layered structure as the one of the second embodiment and having the first intermediate layer 14 composed of Ta having the bcc lattice structure and a thickness of about 4 nm was produced as a comparative example 2-2. A medium having the first intermediate layer 14 composed of Ta that has the bcc lattice structure and a thickness of about 4 nm, and having the second intermediate layer 15, of which average thickness is about 0.8 nm, composed of Cu, and being devoid of the third intermediate layer 16 composed of Ru and a thickness of about 4 nm was produced as a comparative example 2-3. The films other than the intermediate layers and the conditions for a process are identical to those adapted to the second embodiment.

Figure 7:
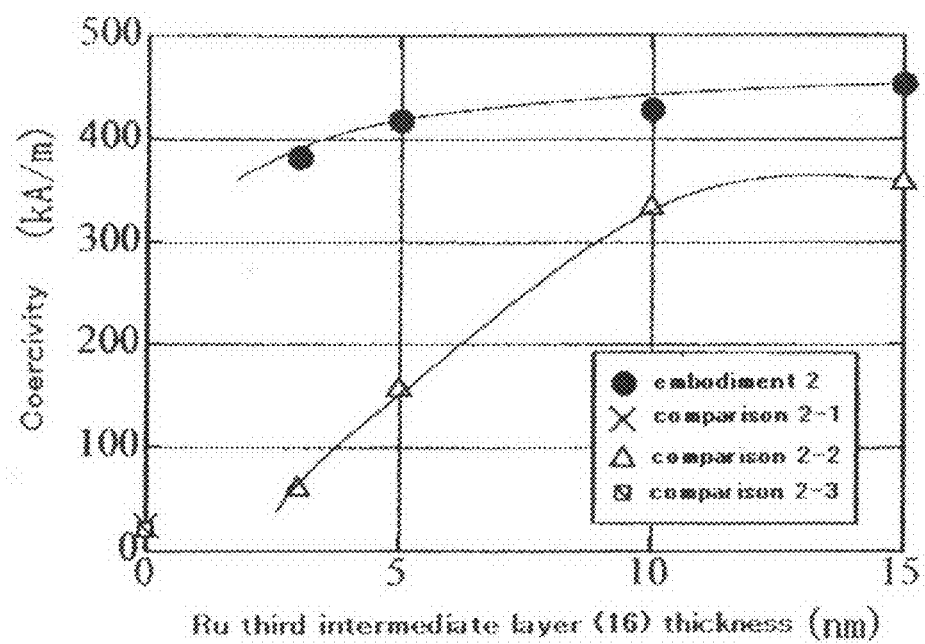
FIG. 7 shows the dependence of the coercivity of second embodiment and comparative examples 2-1 to 2-3 on the thickness of third intermediate layer.
Figure 8:
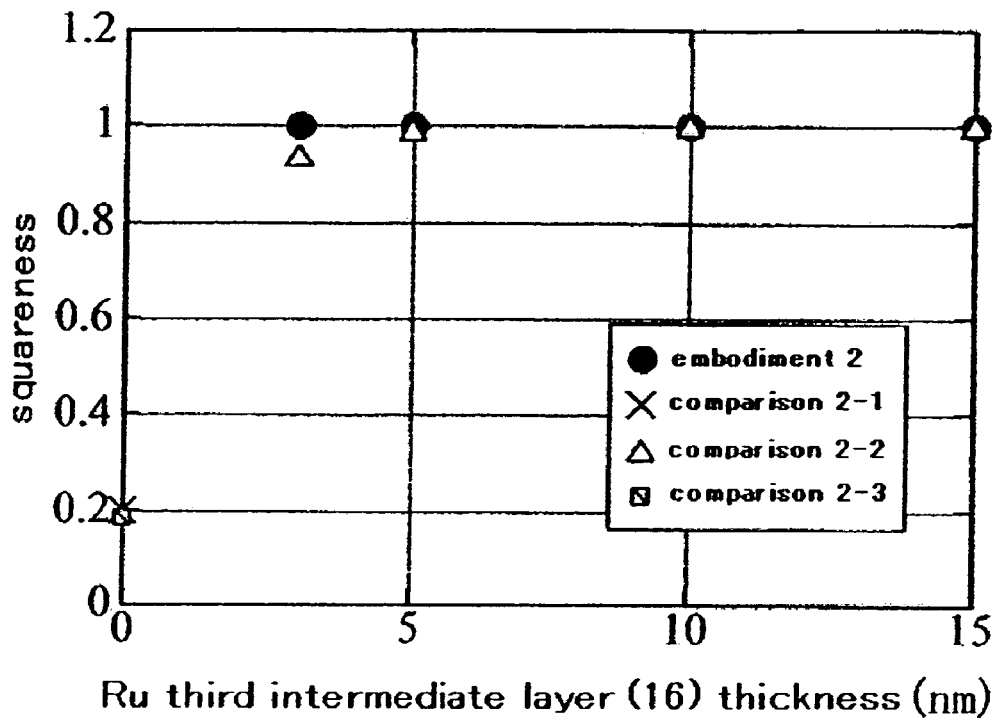
FIG. 8 shows the dependence of the squareness ratio of the second embodiment and comparative examples 2-1 to 2-3 on the thickness of the third intermediate layer.

FIG. 7 and FIG. 8 show the measured coercivity and squareness ratio of the media of the second embodiment and the comparative examples 2-1, 2-2, and 2-3 respectively.

As seen from FIG. 7 and FIG. 8, the coercivity and squareness ratio of the media of the second embodiment are larger than those of the comparative examples 2-1 and 2-3 devoid of the Ru third intermediate layer. This signifies that the Ru third intermediate layer plays a key role in improvement of the crystallographic texture of the magnetic recording layer and attainment of excellent magnetic properties. Moreover, the coercivity of the medium of the second embodiment is larger than that of the comparative example 2-2. The decrease in the coercivity along with the decrease in the thickness of the Ru third intermediate layer down to 3 nm is limited.

Figure 9:
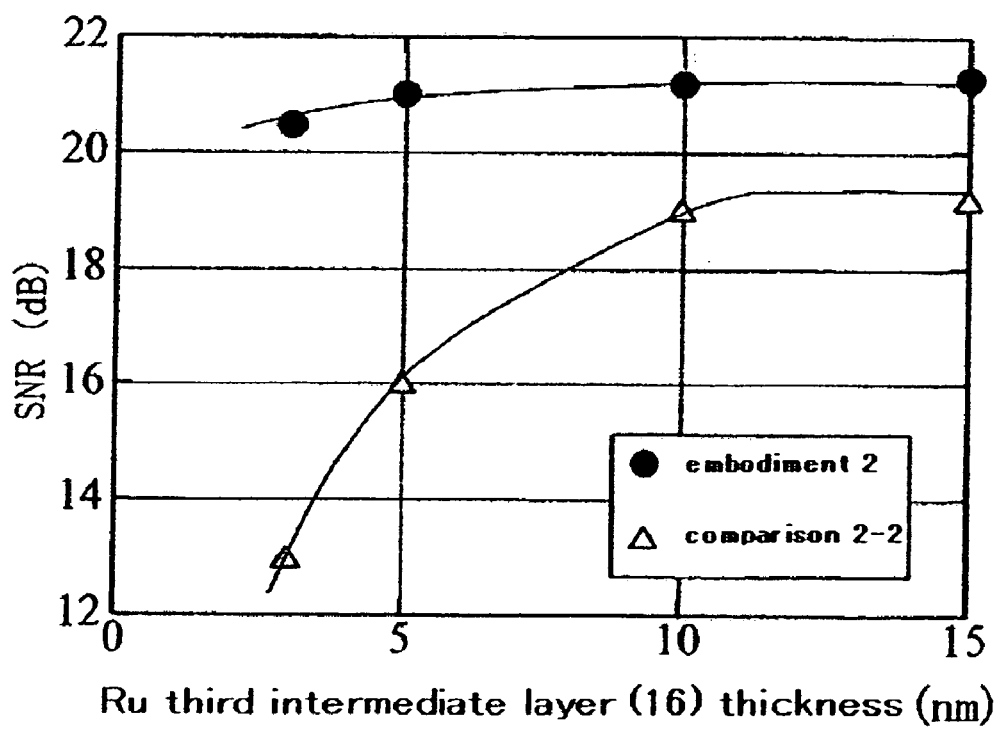
FIG. 9 shows the dependence of the signal-to-noise ratio of the second embodiment and comparative example 2-2 on the thickness of the third intermediate layer.
Figure 10:
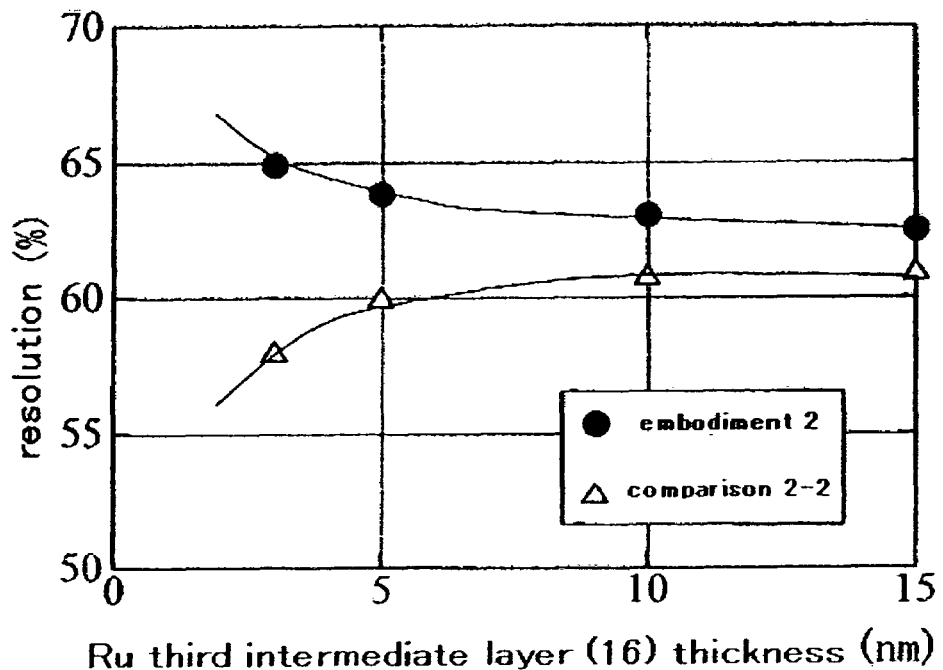
FIG. 10 shows the dependence of the resolution of the second embodiment and comparative example 2-2, on the thickness of the third intermediate layer.

FIG. 9 and FIG. 10 show the signal-to-noise ratio and resolution of the media of the second embodiment and those of comparative example 2-2. In the case of the comparative example 2-2 having the first intermediate layer composed of Ta that has the bcc lattice structure, both the signal-to-noise ratio and resolution drastically decrease along with the decrease in the thickness of the Ru third intermediate layer. This is presumably because the magnetic isolation of the crystal grains in the magnetic recording layer from one another is attained unsatisfactorily.

On the other hand, in the case of the media of the second embodiment, when the thickness of the Ru third intermediate layer is decreased, the decrease in the signal-to-noise ratio is largely suppressed and the resolution is improved. Namely, in the media of the present embodiment having the first intermediate layer composed of Ti that has the hcp structure instead of Ta that has the bcc lattice structure, even when the Ru third intermediate layer is thin, the magnetic isolation of the crystal grains in the magnetic recording layer from one another takes place. This results in excellent magnetic properties and excellent recording and reproducing performances.

The magnetic isolation is promoted because the second intermediate layer composed of Cu that has the fcc lattice structure is formed on the first intermediate layer composed of Ti that has the hcp structure. Consequently, roughness is formed on the surface of Ti layer, and the grain nucleation of the Ru third intermediate layer starts from the roughness. This results in the increase in the surface roughness of Ru layer. Segregation of a Si oxide or any other oxide in the magnetic recording layer to grain boundaries is thought to be promoted. In order to confirm the promotion, samples were produced to have the same films as the second embodiment and the comparative examples 2-1, 2-2, and 2-3 under the same conditions for a process, and removed from the sputtering equipment without formation of their magnetic recording layers and subsequent layers. The surface morphology of the samples was observed using an atomic force microscope.

Figure 11:
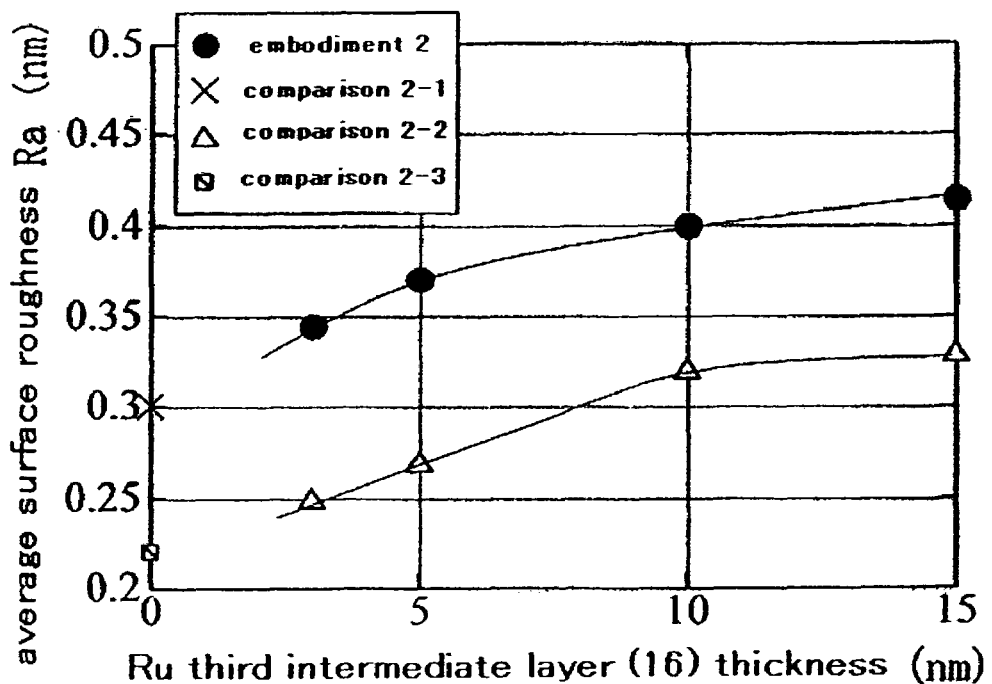
FIG. 11 shows the dependence of the average surface roughness Ra, which is exhibited the second embodiment and comparative examples 2-1 to 2-3, on the thickness of the third intermediate layer.

FIG. 11 shows the average surface roughness Ra. When the samples whose Ru third intermediate layers have the same thickness are compared with one another, it is seen that the surface roughness of the Ru intermediate layer of the second embodiment is lager than that of the Ru intermediate layer of the comparative example 2-2. Moreover, the comparison of the comparative example 2-1 with the comparative example 2-3 demonstrates that the surface roughness of the Cu second intermediate layer formed on the first intermediate layer composed of Ti having the hcp structure is larger than the surface roughness of the Cu second intermediate layer formed on the first intermediate layer composed of Ta having the bcc lattice structure. Consequently, since the second intermediate layer composed of Cu having the fcc lattice structure is formed on the first intermediate layer composed of Ti having the hcp structure, roughness with large enough Ra is formed. The grain nucleation of the Ru third intermediate layer starts from the roughness. Eventually, the Ru surface roughness is increased, and the magnetic decoupling of the crystal grains in the magnetic recording layer is promoted.

Figure 12:
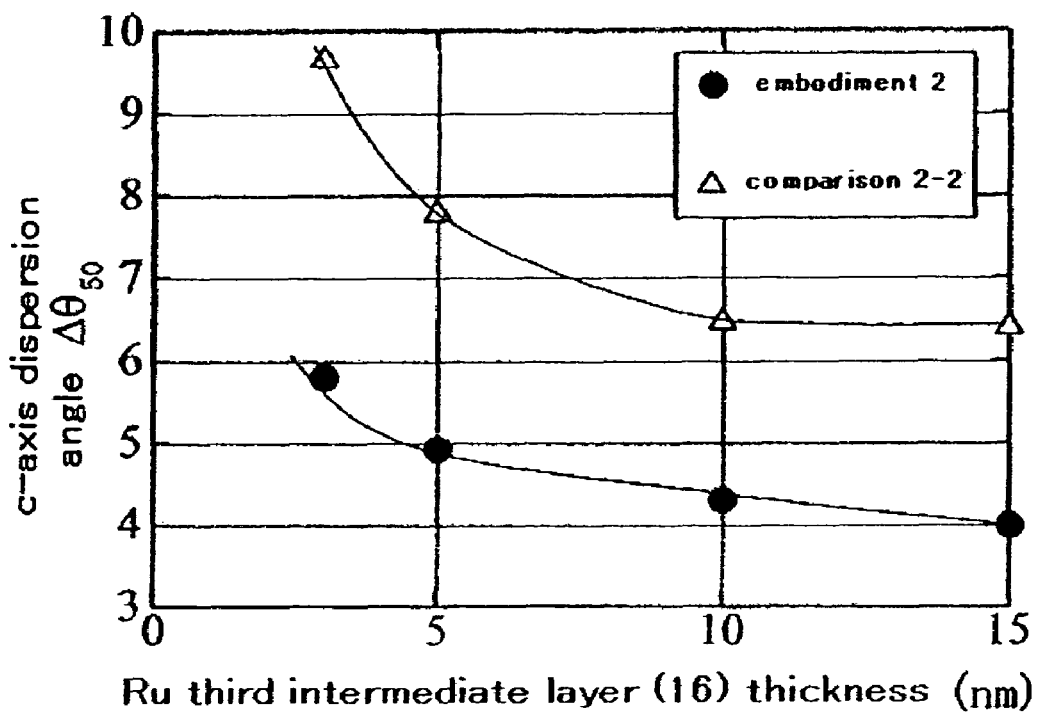
FIG. 12 shows the dependence of the dispersion angle $\Delta\theta_{50}$ values, which are exhibited by the second embodiment and comparative example 2-2, on the thickness of the third intermediate layer.

FIG. 12 shows the $\Delta\theta_{50}$ values of Ru (0002) that is a sample without magnetic recording layer and subsequent layer. Herein, $\Delta\theta_{50}$ indicates the full width at half maximum of an rocking curve measured by X-ray diffraction method. The $\Delta\theta_{50}$ values of the second embodiment having the first intermediate layer thereof composed of Ti that has the hcp structure are smaller than the $\Delta\theta_{50}$ values of the comparative example 2-2 having the first intermediate layer thereof composed of Ta that has the bcc lattice structure. Namely, the Ru intermediate layer of the second embodiment exhibits a stronger (0002) texture. The other factor of making the coercivity of the medium of the second embodiment larger than that of the comparative example 2-2 is that the stronger (0002) texture of the Ru intermediate layer contributes to improvement of the crystallographic texture of the magnetic recording layer, the magnitude of the magnetic anisotropy is increased, and the dispersion of the magnetic anisotropy is reduced.

The foregoing results of assessment demonstrate that when the first intermediate layer is composed of Ti, which has the hcp structure, instead of Ta that has the bcc lattice structure, if the second intermediate layer is composed of Cu having the fcc lattice structure and the third intermediate layer is composed of Ru, although the thickness of the intermediate layers is thin, excellent crystallographic texture of the magnetic recording layer can be attained and the magnetic decoupling of the crystal grains in the magnetic recording layer from one another can be realized, resulting in a high signal-to-noise ratio and a high resolution.

Third Embodiment

A perpendicular magnetic recording medium in accordance with the third embodiment is produced to have the same layered structure as the first embodiment under the same conditions for a process using the same sputtering equipment. As for the compositions of intermediate layers, a first intermediate layer 14 of about 4 nm thick that is composed of Ti, a second intermediate layer 15 having an average thickness of about 1 nm, and a third intermediate layer of about 10 nm thick that is composed of Ru are formed successively. The second intermediate layer 15 is composed of any of Al, Ag, Au, Cu, Ni, Pd, Au-50 at. % Cu, Cu-15 at. % Al, Cu-20 at. % Ni, Ag-30 at. % Pd, Cu-5 at. % Ti, Cu-3 at. % Ta, Cu-3 at. % B, Ag-40 at. % Cu, and Cu-45 at. % Pd. As samples to be compared with the third embodiment, media whose intermediate layers have compositions described below were produced. A medium having the same layered structure as the third embodiment and having the second intermediate layer 15 composed of Cr having the bcc lattice structure was produced as a comparative example 3-1. A medium having the same layered structure as the third embodiment and having the second intermediate layer 15 composed of Ta having the bcc lattice structure was produced as a comparative example 3-2. The films other than the intermediate layers and the conditions for a process are identical to those adapted to the third embodiment.

For measurement of a coercivity and a squareness ratio, similarly to that in the first embodiment, Kerr effect measuring equipment was employed. Moreover, recording performances were evaluated using a spin stand. The method of evaluation is identical to that employed in the first embodiment. Moreover, a medium having Ru third intermediate layer 16 and preceding layers formed was also produced, and the average surface roughness Ra of the Ru layer was evaluated using an atomic force microscope.

Table 2 lists the coercivity, squareness ratio, signal-to-noise ratio, and surface roughnesses of intermediate layers obtained by measuring the third embodiment and the comparative examples 3-1 and 3-2.

TABLE 2

|  | Second intermediate layer 15 | Crystal structure | Coercivity (kA/m) | Squareness ratio | Ra (nm) | SNR (*1) |
|---|---|---|---|---|---|---|
| Example 3-1 | Al | fcc lattice structure | 470 | 0.98 | 0.46 | 20.3 |
| Example 3-2 | Ag | fcc lattice structure | 455 | 0.99 | 0.42 | 20.7 |

TABLE 2-continued

|  | Second intermediate layer 15 | Crystal structure | Coercivity (kA/m) | Squareness ratio | Ra (nm) | SNR (*1) |
|---|---|---|---|---|---|---|
| Example 3-3 | Ag—30at. % Pd | fcc lattice structure | 425 | 1 | 0.37 | 21.8 |
| Example 3-4 | Ag—40at. % Cu | fcc lattice structure | 420 | 0.98 | 0.37 | 21.5 |
| Example 3-5 | Au | fcc lattice structure | 441 | 1 | 0.41 | 21.4 |
| Example 3-6 | Au—50at % Cu | fcc lattice structure | 450 | 1 | 0.42 | 21.3 |
| Example 3-7 | Cu | fcc lattice structure | 443 | 1 | 0.40 | 21.5 |
| Example 3-8 | Cu—15at. % Al | fcc lattice structure | 448 | 1 | 0.41 | 21.4 |
| Example 3-9 | Cu—5at. % Ti | fcc lattice structure | 426 | 1 | 0.37 | 22.0 |
| Example 3-10 | Cu—5at. % Ta | fcc lattice structure | 416 | 0.97 | 0.36 | 21.7 |
| Example 3-11 | Cu—3at. % B | fcc lattice structure | 413 | 0.95 | 0.35 | 21.6 |
| Example 3-12 | Cu—20at. % Ni | fcc lattice structure | 422 | 0.99 | 0.37 | 22.0 |
| Example 3-13 | Cu—45at. % Pd | fcc lattice structure | 425 | 1 | 0.37 | 22.1 |
| Example 3-14 | Ni | fcc lattice structure | 413 | 0.98 | 0.35 | 20.1 |
| Example 3-15 | Pd | fcc lattice structure | 412 | 1 | 0.33 | 21.1 |
| Comparative example 3-1 | Cr | bcc lattice structure | 195 | 0.5 | 0.25 | 14.0 |
| Comparative example 3-2 | Ta | bcc lattice structure | 279 | 1 | 0.22 | 18.6 |

(*1) SNR: Signal-to-noise ratio

As apparent from Table 2, when any of various materials having the fcc lattice structure is used to form the second intermediate layer, compared with when Cr or Ta having the bcc lattice structure is used, the medium exhibits a high coercivity and a high signal-to-noise ratio. Moreover, the surface roughness of the Ru third intermediate layer of the third embodiment is larger than those of the comparative examples 3-1 and 3-2. Namely, when the thin second intermediate layer composed of a metal having the fcc lattice structure or an alloy having the fcc lattice structure instead of a metal having the bcc lattice structure is formed on the first intermediate layer composed of Ti having the hcp structure, roughness derived from the island growth are formed. When the Ru third intermediate layer is formed on the roughness, the surface roughness of Ru is increased. The increase in surface roughness of Ru promotes the magnetic decoupling of the crystal grains in the granular magnetic recording layer from one another. This presumably results in the high signal-to-noise ratio.

The increase in the surface roughness of Ru derived from formation of the second intermediate layer 15, which is thin and is composed of a metal or an alloy having the fcc lattice structure, on the first intermediate layer composed of Ti having the hcp structure has presumably relation to the melting point. As the melting point of a material is lower, the surface roughness is further increased. Consequently, the magnetic decoupling of the crystal grains in the magnetic recording layer is promoted. On the other hand, the grain size of the magnetic recording layer is likely to increase. For reduction in the grain size, it would prove effective to add a material having a high melting point, such as, Ta or Ti or a nonmetallic element to a metal or an alloy having the fcc lattice structure. Moreover, an alloy of metals whose melting points are different from each other and which have the fcc lattice structure may be used to vary a melting point, whereby surface roughness and a grain size can be controlled. The employment of the materials listed in Table 2 leads to improvement of a signal-to-noise ratio. This is presumably because the grain size of a metal or an alloy having the fcc lattice structure is reduced with large enough surface roughness retained.

On the other hand, if the melting point of a metal or an alloy that has the fcc lattice structure and that constitutes the second intermediate layer is too high, roughness is lessened and the magnetic decoupling of the crystal grains in the magnetic recording layer from one another is hindered. When a process in which a substrate is not heated but treated at about 100☐ C. is adopted, a material whose melting point is not higher than that of Pd is preferred.

Fourth Embodiment

A perpendicular magnetic recording medium in accordance with the fourth embodiment is produced to have the same layered structure as the one of the first embodiment under the same conditions for a process using the same sputtering equipment. As intermediate layers, a first intermediate layer 14 of about 4 nm thick, a second intermediate layer 15 whose average thickness was about 0.8 nm and which is composed of Cu, and a Ru third intermediate layer 16 of about 10 nm thick are formed. As the material of the first intermediate layer 14, a material having the hcp structure such as Ti, Zr, Hf, Ti-5 at. % Cr, Ti-10 at. % Cr, Ru, or Re is adopted. As samples to be compared with the fourth embodiment, media whose intermediate layers have compositions listed below were produced. A medium having the same layered structure as the fourth embodiment and having the first intermediate layer 14 composed of Cr that has the bcc lattice structure was produced as a comparative example 4-1. A medium having the same layered structure as the fourth embodiment and having the first intermediate layer 14 composed of Ag that has the fcc lattice structure was produced as a comparative example 4-2. The films other than the intermediate layers and the conditions for a process are identical to those adapted to the fourth embodiment.

Kerr effect measuring equipment was used to measure the magnetic properties of the fourth embodiment and comparative examples. Moreover, a spin stand was used to evaluate the recording performances thereof. The method of evaluation is identical to that employed in the first embodiment. Table 3 lists the coercivity, squareness ratio, and signal-to-noise ratio obtained from Kerr loops.

TABLE 3

| | First intermediate layer 14 | Crystal structure | Coercivity (kA/m) | Squareness ratio | Signal-to-noise ratio |
|---|---|---|---|---|---|
| Example 4-1 | Ti | hcp structure | 439 | 1 | 21.4 |
| Example 4-2 | Zr | hcp structure | 410 | 0.98 | 20.6 |
| Example 4-3 | Hf | hcp structure | 414 | 0.99 | 20.8 |
| Example 4-4 | Ti—5at. % Cr | hcp structure | 427 | 1 | 21.5 |
| Example 4-5 | Ti—10at. % Cr | hcp structure | 405 | 0.97 | 20.5 |
| Example 4-6 | Ru | hcp structure | 334 | 0.91 | 19.3 |
| Example 4-7 | Re | hcp structure | 326 | 0.9 | 19.1 |
| Comparative example 4-1 | Cr | bcc lattice structure | 207 | 0.55 | 14.4 |
| Comparative example 4-2 | Ag | fcc lattice structure | 255 | 0.79 | 15.2 |

As apparent from Table 3, when any of materials having the hcp structure is adopted as the first intermediate layer, compared with when Cr having the bcc lattice structure or Ag having the fcc lattice structure is adopted, the coercivity, the squareness ratio, and signal-to-noise ratio are high.

In particular, when any of Ti, Zr, Hf, Ti-5 at. % Cr, or Ti-10 at. % Cr is adopted, the medium exhibits excellent properties. Excellent wettability and a strong (111) texture are attained because these materials exhibits strong interfacial interaction with a metal or alloy having the fcc lattice structure and constituting the second intermediate layer. Moreover, owing to the strong interfacial interaction, migration and coalescence of islands are suppressed during three-dimensional island growth in early stages of crystal growth. Consequently, the density of islands increases and the size in a lateral direction of islands decreases. Eventually, presumably, the grain size of the third intermediate layer grown on the islands is reduced, and a high signal-to-noise ratio is attained.

Fifth Embodiment

A perpendicular magnetic recording medium in accordance with the fifth embodiment is produced to have the same layered structure as that of the first embodiment under the same conditions for a process using the same sputtering equipment. However, as intermediate layers, after a Ti first intermediate layer of about 4 nm thick is formed, the medium is exposed to an atmosphere of an argon-oxygen mixed gas for ten sec. within the sputtering chamber in order to oxidize the surface. Thereafter, a Cu second intermediate layer 15 having an average thickness of about 0.8 nm and a Ru third intermediate layer 16 of about 10 nm thick are formed successively. The pressure of the argon-oxygen mixed gas used for oxidization process is set to 2.2 Pa, and the ratio of oxygen to the mixed gas is varied in the range from 0% to 3%. A medium was also produced as a comparative example 5-1, wherein after a Ti oxide of about 4 nm thick was formed as a first intermediate layer 14 by RF sputtering, a Cu second intermediate layer 15 having an average thickness of about 0.8 nm and a Ru third intermediate layer of about 10 nm thick were successively formed.

Kerr effect measuring equipment was used to measure the magnetic properties of the fifth embodiment and comparative examples, and a spin stand was used to evaluate the recording and reproducing performances thereof. The method of evaluation is identical to that employed in the first embodiment.

Figure 13:
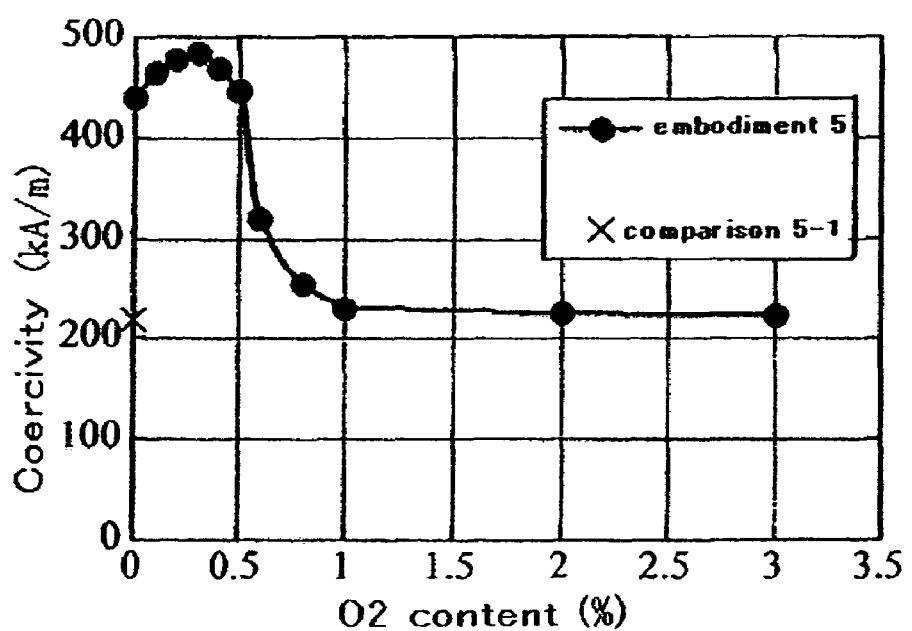
FIG. 13 shows the dependencies of the coercivities, which are required by an example 5-1 and a comparative example 5-1, on oxygen concentrations.
Figure 14:
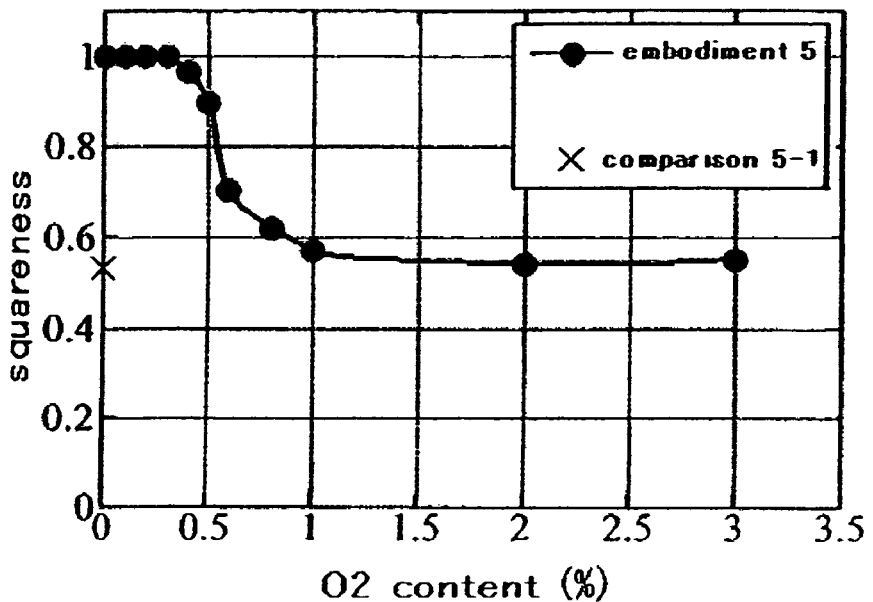
FIG. 14 shows the dependence of the squareness ratio of the example 5-1 and comparative example 5-1 on the oxygen contents.
Figure 15:
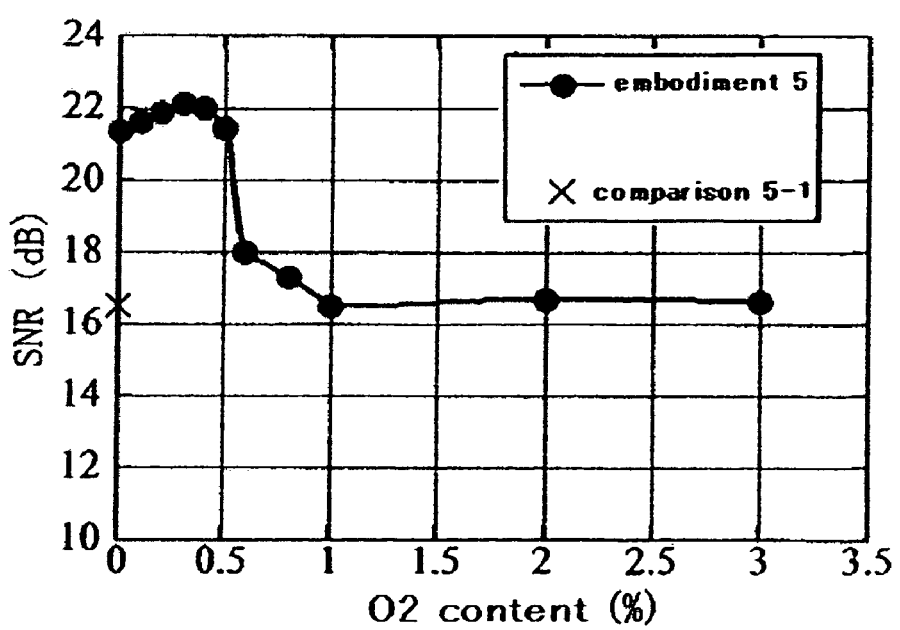
FIG. 15 shows the dependence of the signal-to-noise ratio of the example 5-1 and comparative example 5-1 on the oxygen contents.

FIG. 13 to FIG. 15 show the coercivity, squareness ratio, and signal-to-noise ratio of the fifth embodiment. When the ratio of oxygen to the argon-oxygen mixed gas is equal to or smaller than about 0.5%, degradation in the crystallographic texture of the magnetic recording layer is limited and the squareness ratio equal to or larger than about 0.9 is attained. When the squareness ratio is equal to or larger than about 0.9, compared with when the surface of the Ti first intermediate layer is not oxidized, both the coercivity and the signal-to-noise ratio are high. On the other hand, when the ratio of oxygen exceeds about 0.5%, the crystallographic texture is degraded to decrease the squareness ratio. Accordingly, both the coercivity and signal-to-noise ratio drastically decrease. When the ratio of oxygen is equal to or larger than about 1%, the squareness ratio, coercivity, and signal-to-noise ratio decrease to nearly the same levels as those of the medium having a Ti oxide formed as the first intermediate layer thereof. Consequently, when the ratio of oxygen is equal to or larger than about 1%, the surface of Ti is nearly fully oxidized.

Media whose Ru third intermediate layers and preceding layers were formed according to the same process as the medium without the Ti surface oxidization process and with the Ti surface oxidization process using a mixed gas whose oxygen concentration was 0.2% was removed from the sputtering equipment. The surface morphology of the Ru layer of the medium was observed using an atomic force microscope in order to evaluate the average surface roughness and the mean spacing of profile irregularities (grain size). Moreover, the grain sizes of the magnetic recording layers of the media whose recording and reproducing performances were evaluated were measured using a high-resolution transmission electron microscope. Table 4 lists the results of the assessment.

TABLE 4

| | Process for surface oxidization | Ra of third intermediate layer (nm) | Grain size of third intermediate layer (nm) | Grain size of recording layer (nm) |
|---|---|---|---|---|
| Fifth embodiment | None | 0.4 | 8.5 | 7.5 |
| Fifth embodiment | 10 sec at 0.2% | 0.42 | 7.5 | 6.4 |

As seen from Table 4, when the surface of the Ti first intermediate layer is oxidized with an oxygen content of 0.2%, the surface roughness of the Ru third intermediate layer is increased and the grain size thereof is reduced. Consequently, the magnetic decoupling of the crystal grains in the magnetic recording layer from one another is promoted, and the crystal grain size of the magnetic recording layer is decreased. Compared with the case when the surface of the first intermediate layer is not oxidized, the signal-to-noise ratio of the medium is improved further. The reduction in the grain size of the Ru third intermediate layer and the increase in the surface roughness are thought to result from the reduction in the grain size of the Cu second intermediate layer underlying the third intermediate layer and the increase in the surface roughness thereof. Cu having the fcc lattice structure and constituting the second intermediate layer exhibits good wettability on Ti due to the strong interfacial interaction. However, the wettability of Cu on an oxide is poor. Therefore, it selectively grows on the surface of Ti which is not oxidized to minimize the surface energy and its growth in lateral directions is suppressed due to the presence of oxides.

On the other hand, when the surface of the Ti first intermediate layer is fully covered with oxides, on whatever place it grows, the surface energy is equal. The effect of reduction in a grain size is not provided. Moreover, the degradation in crystallographic texture is induced. This is undesirable.

The foregoing results of assessment have revealed that when oxides are formed part of the surface of the Ti first intermediate layer within a range of squareness ratios equal to or larger than about 0.9, the degradation in crystallographic texture can be suppressed, the grain size of the recording layer can be reduced, and formation of grain boundaries can be promoted. Consequently, a high signal-to-noise ratio is attained. Moreover, even when any of Zr, Hf, or Ti-10 at. % Cr is adopted as the first intermediate layer instead of Ti, if the surface of the first intermediate layer is oxidized while being exposed to the argon-oxygen mixed gas whose oxygen concentration is about 0.5% or less in the same manner as the surface of the first intermediate layer composed of Ti is, the coercivity is increased and the signal-to-noise ratio is improved.

Sixth Embodiment

A perpendicular magnetic recording medium in accordance with the sixth embodiment is produced to have the same layered structure as the one of the first embodiment under the same conditions for a process using the same sputtering equipment. However, a soft-magnetic underlayer 13 is formed by successively layering an Ni-20 at. % Fe alloy of about 5 nm thick, an Mn-20 at. % Ir alloy of about 8 nm thick, and a Fe-25.5 at. % Co-15 at. % B alloy of about 150 nm thick. Moreover, as intermediate layers, a Ti first intermediate layer 14 of about 4 nm thick, a Cu second intermediate layer 15 having an average thickness of about 0.8 nm, and a third intermediate layer 16 of about 10 nm thick are formed successively. As the third intermediate layer 16, oxides or nitrides are formed by sputtering Ru-5 at. % Si, Ru-5 at. % B, or Ru using an argon-oxygen mixed gas or an argon-nitrogen mixed gas whose total pressure is about 2.2 Pa. The oxygen or nitrogen content of argon-oxygen mixed gas and argon-nitrogen mixed gas used for sputtering is about 1% for Ru-5 at. % Si and Ru-5 at. % B, and the oxygen or nitrogen content of argon-oxygen mixed gas and argon-nitrogen mixed gas used for sputtering is about 0.5% for Ru.

A medium having the structure shown in FIG. 1(b) was produced as a comparative example 6-1 or 6-2, wherein a first intermediate layer of about 4 nm thick was composed of Ta that has the bcc lattice structure or Ni-50 at. % Al that has the B2 structure, a third intermediate layer 16 of about 10 nm thick composed of an Ru alloy was formed directly on the first intermediate layer. Kerr effect measuring equipment was used to measure the magnetic properties of the sixth embodiment and comparative examples, and a spin stand was used to evaluate the recording and reproducing performances thereof. The method of evaluation is identical to the one employed in the first embodiment. Table 5 lists the coercivity, squareness ratio, and signal-to-noise ratio.

TABLE 5

| | Third intermediate layer | Second intermediate layer | First intermediate layer | Coercivity (kA/m) | Squareness ratio | Signal-to-noise ratio (dB) |
|---|---|---|---|---|---|---|
| Example 6-1 | Ru | Cu 0.8 nm | Ti | 439 | 1 | 21.4 |
| Example 6-2 | Ru—0.5% $O_2$ | Cu 0.8 nm | Ti | 454 | 0.96 | 22.1 |
| Example 6-3 | Ru—Si oxide | Cu 0.8 nm | Ti | 462 | 0.97 | 22.3 |
| Example 6-4 | Ru—B oxide | Cu 0.8 nm | Ti | 460 | 0.98 | 22.3 |
| Example 6-5 | Ru—0.5% $N_2$ | Cu 0.8 nm | Ti | 456 | 0.98 | 22.2 |
| Example 6-6 | Ru—Si nitride | Cu 0.8 nm | Ti | 464 | 0.98 | 22.6 |
| Example 6-7 | Ru—B nitride | Cu 0.8 nm | Ti | 462 | 0.98 | 22.4 |
| Comparative example 6-1 | Ru—Si oxide | None | Ta | 199 | 0.4 | 13.6 |
| Comparative example 6-2 | Ru—Si oxide | None | NiAl | 342 | 0.75 | 18.5 |

Figure 16:
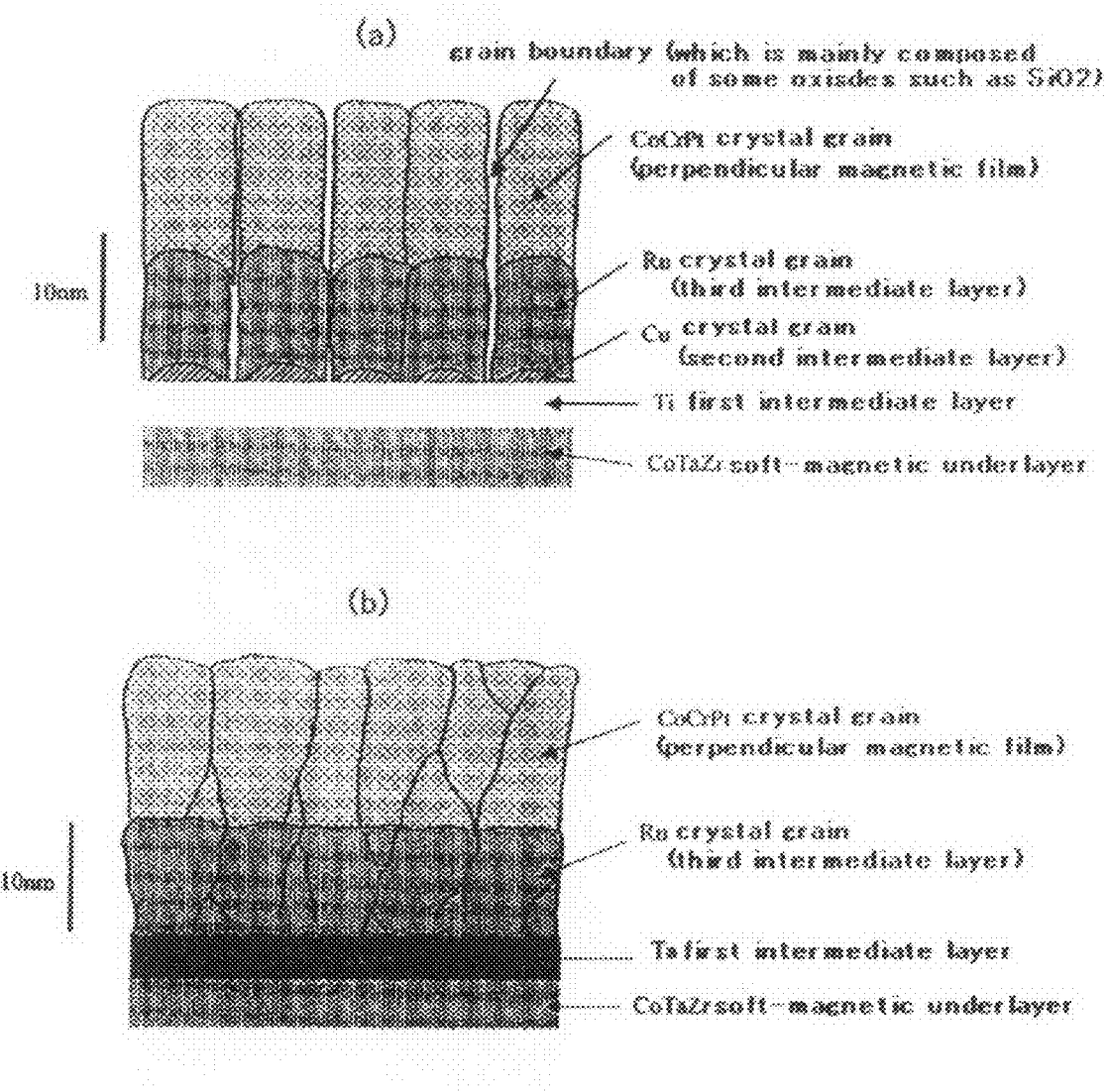
FIG. 16 illustratively shows cross-sectional images of the structure of perpendicular magnetic recording media in accordance with the sixth embodiment and comparative example 6-1 which are observed using a transmission electron microscope.

As apparent from Table 5, when the media of examples 6-2 to 6-7 of the sixth embodiment are compared with the medium of an example 6-1 of the sixth embodiment having pure Ru as the third intermediate layer 16 thereof, their coercivities and signal-to-noise ratios are higher. This is presumably because the magnetic decoupling of the crystal grains in the magnetic recording layers of the media from one another is improved. FIG. 16(*a*) (illustratively) shows the result of observation of the cross-sectional structure of these media using a high-resolution transmission electron microscope. Grain boundaries identified with light contrast regions are formed immediately above the concave parts of roughness created during formation of the Cu second intermediate layer on the Ti first intermediate layer. These results indicate that, in the early stage of growth of the third intermediate layer composed of Ru—SiO2, it is thought to be decomposed into Ru crystal grains and grain boundaries mainly composed of Si oxides. Moreover, grain boundaries composed mainly of Si oxides contained in the magnetic recording layer are formed on the grain boundaries composed of oxides. In other words, the fact that separation of Co—Cr—Pt ferromagnetic crystal grains from oxides such as Si oxides is promoted in the initial growth layer of the magnetic recording layer leads to the improvement of the signal-to-noise ratio.

FIG. 16(*b*) illustratively shows the cross-sectional structure of the medium of the comparative example 6-4 having the Ru—SiO2 third intermediate layer formed directly on the first intermediate layer composed of Ta having the bcc lattice crystal structure. The interface between the third intermediate layer composed of Ru and Si oxides and the Ta first intermediate layer is flat. In this case, Ru and the Si oxides are not separated from each other, and a clear contrast is not observed. Consequently, the crystallographic texture of the intermediate layers is markedly degraded and the squareness ratio of the medium is degraded. Moreover, the effect of promoting the separation of the ferromagnetic crystal grains in the initial growth layer of the granular magnetic recording layer from the non-magnetic oxides is not provided.

In the comparative example 6-2, an Ru—Si oxide is formed directly on the first intermediate layer composed of Ni-50 at. % Al and having the B2 structure. Both the magnetic properties and signal-to-noise ratio of the comparative example 6-2 are superior to those of the comparative example 6-1 including the Ta intermediate layer. The magnetic decoupling of the crystal grains in the initial growth layer of the magnetic recording layer is thought to have progressed. However, compared with the sixth embodiment, the coercivity, the squareness ratio, and the signal-to-noise ratio are low. This presumably reflects the fact that when Ru having the hcp structure is formed on the first intermediate layer composed of Ni-50 at. % Al and having the B2 structure, the c-axis orientation is not quite satisfactory.

The foregoing results of assessment have revealed that when a granular intermediate layer composed of Ru and oxides or nitrides is adopted as the third intermediate layer, the roughness of an underlying layer plays a key role in promoting the separation of Ru from the oxides or nitrides. Moreover, when the roughness are produced using a metal having the fcc lattice structure, degradation of crystallographic texture can be suppressed. Consequently, while the strong crystallographic texture is maintained, separation of the Co—Cr—Pt ferromagnetic crystal grains in the initial growth layer of the magnetic recording layer from the Si oxides or the like can be improved. This largely contributes to improvement of the signal-to-noise ratio.

Seventh Embodiment

A perpendicular magnetic recording medium in accordance with the seventh embodiment is produced to have the same layered structure as that of the first embodiment under the same conditions for a process using the same sputtering equipment. However, as intermediate layers, a Ti first intermediate layer 14, a Cu second intermediate layer 15 having an average thickness of about 0.8 nm, and a Ru third intermediate layer 16 of about 10 nm thick are successively formed. Incidentally, a medium having the thickness of a Ti first intermediate layer 14 thereof varied within a range from about 0.5 nm to 10 nm was produced as an example 7-1. Moreover, a medium having a Ta layer of about 1 nm thick interposed between a soft-magnetic underlayer 13 and a first intermediate layer was also produced as an example 7-2.

Figure 17:
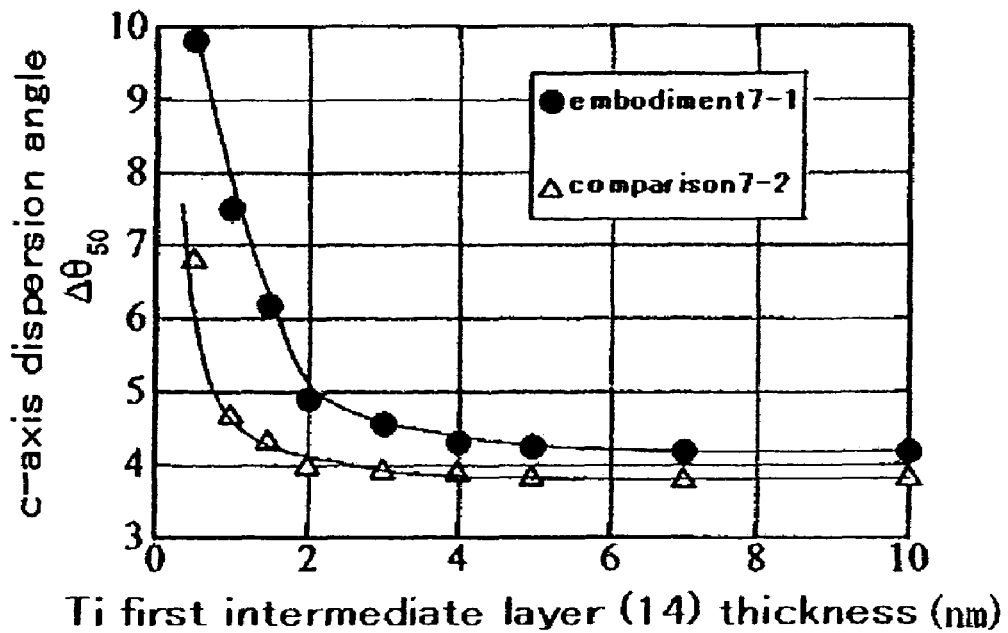
FIG. 17 shows the dependence of the dispersion angle $\Delta\theta_{50}$ values of examples 7-1 and 7-2 on the thickness of first intermediate layer.

FIG. 17 shows the $\Delta\theta_{50}$ values of Ru (0002) of these media. In the case of the example 7-1 devoid of the Ta layer, the thickness of the Ti layer is made equal to or larger than about 2 nm for the purpose of improving the c-axis orientation. In the case of the example 7-2 having the Ta layer, the thickness of the Ti layer is made equal to or larger than about 1 nm for the purpose of improving the axial orientation. Moreover, the orientation exhibited by the example 7-2 having the Ta layer is higher than that by the example 7-1.

Figure 18:
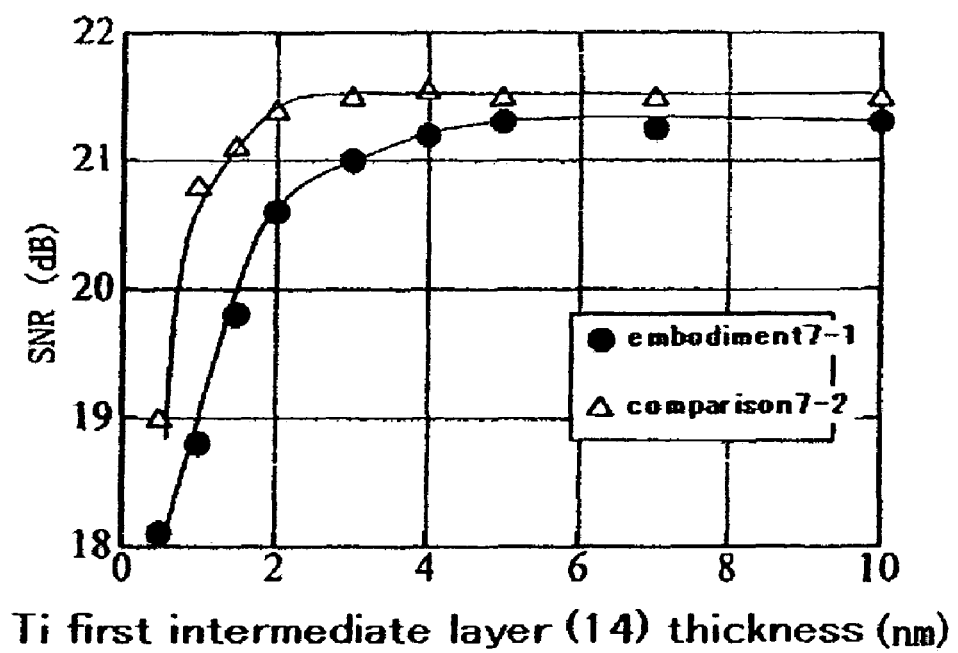
FIG. 18 shows the dependence of the signal-to-noise ratio of the examples 7-1 and 7-2 on the thickness of the first intermediate layer.
Figure 19:
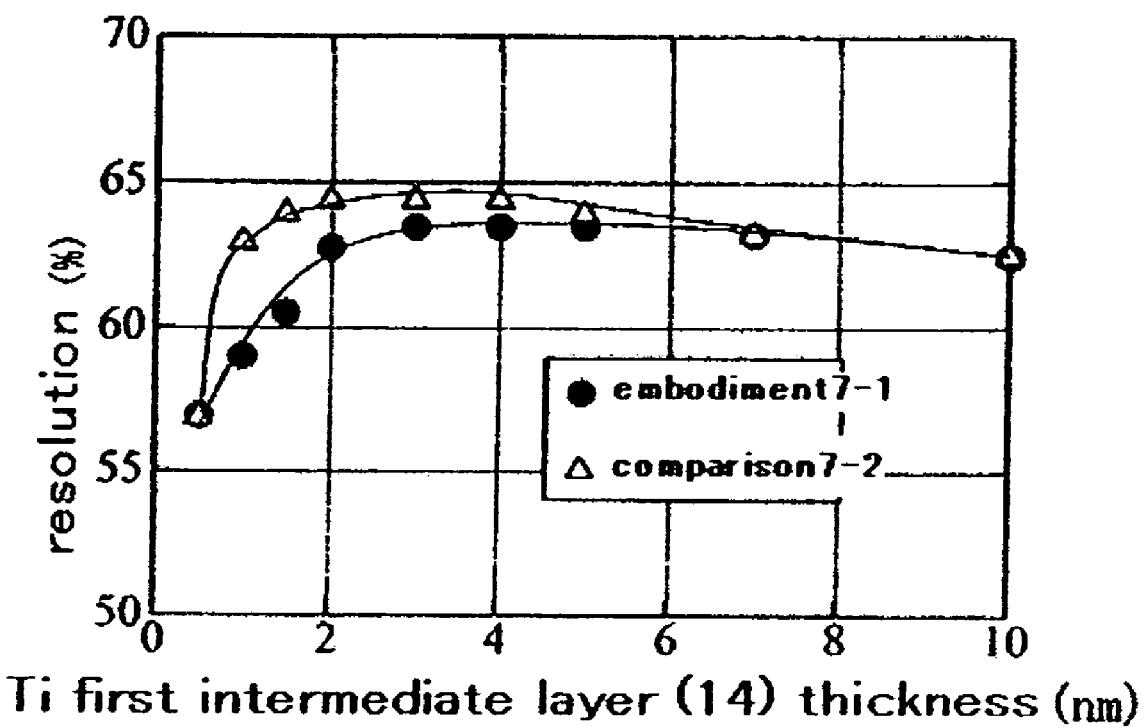
FIG. 19 shows the dependence of the resolution of the examples 7-1 and 7-2 on the thickness of the first intermediate layer.

FIG. 18 and FIG. 19 show the signal-to-noise ratio and resolution of the media. In the case of the example 7-1 devoid of the Ta layer, if the thickness of the Ti layer falls below about 2 nm, the crystallographic texture of the Ru third intermediate layer is degraded. The signal-to-noise ratio and resolution are therefore degraded. If the thickness of the Ti layer is equal to or larger than about 2 nm, a high signal-to-noise ratio and a high resolution are attained. In the case of the example 7-2 having the Ta layer, even if the thickness of the Ti layer is decreased down to about 1 nm, a high signal-to-noise ratio and a high resolution are offered. This is presumably because the Ta layer contributes to improvement of the c-axis orientation of the Ru third intermediate layer and improvement of the orientation of the magnetic recording layer.

The foregoing results of assessment have revealed that the thickness of the first intermediate layer may be equal to or larger than about 2 nm as long as the crystallographic texture of the Ru third intermediate layer can be controlled. In the case of a double-layer perpendicular medium, the increase in the thickness of intermediate layers may induce degradation in write-ability and decrease in a resolution. From this standpoint as well as the standpoint of the cost of materials, the thickness of intermediate layers should be set to the smallest value within a range of values within which the above condition is met. In practice, as long as the thickness ranges from about 2 nm to about 10 nm, no problem will occur. Moreover, when a Ta layer is inserted, the thickness of the first intermediate layer can be decreased down to about 1 nm. Moreover, the crystallographic texture can be improved, and the signal-to-noise ratio and resolution can be improved.

Eighth Embodiment

A perpendicular magnetic recording medium in accordance with the eighth embodiment is produced to have the same layered structure as the one of the first embodiment under the same conditions for a process using the same sputtering equipment. However, a magnetic recording layer 17 is formed by layering fifteen pairs of CoB10 and Pd. Rotating cathodes are used to form the magnetic recording layer 17. Power to be supplied to the rotating cathodes is adjusted so that Co will have a thickness of about 0.3 nm and Pd will have a thickness of about 0.7 mm while the rotating cathodes rotate one turn, and the rotating cathodes are discharged simultaneously. For formation of the magnetic recording layer, an argon-oxygen mixed gas is used. The total pressure of the mixed gas is set to 5.6 Ps, and the ratio of oxygen to the mixed gas is set to 0.2%. Moreover, as for the compositions of the intermediate layers, a first intermediate layer of about 4 nm thick is composed of Ti, a second intermediate layer having an average thickness of about 0.8 nm is composed of Cu, and a third intermediate layer of about 3 nm thick is composed of Ru.

As samples to be compared with the eighth embodiment, media including intermediate layers whose compositions are described below were produced. A medium having the same layered structure as the eighth embodiment, having MgO of about 1 nm thick formed as a first intermediate layer, having Cu, which has an average thickness of about 0.8 nm, formed as a second intermediate layer, and having Ru of about 3 nm thick formed as a third intermediate layer was produced as a comparative example 8-1. A medium having Ta of about 4 nm thick formed as a first intermediate layer and having Ru of about 3 nm thick formed as a third intermediate layer directly on the first intermediate layer without intervention of a second intermediate layer was produced as a comparative example 8-2. However, the components other than the intermediate layers and the conditions for a process are identical to those adapted to the eighth embodiment. Table 6 lists the coercivity, the dispersion angle $\Delta\theta_{50}$ of (111) peak of the magnetic recording layer, and the signal-to-noise ratios.

TABLE 6

| | Third intermediate layer | Second intermediate layer | First intermediate layer | Coercivity | $\Delta\theta_{50}$ value | SNR(dB) (*1) |
|---|---|---|---|---|---|---|
| Example 8-1 | Ru | Cu 0.8 nm | Ti | 493 | 4.3 | 18.9 |
| Comparative example 8-1 | Ru | Cu 0.8 nm | MgO 1 nm | 406 | 11 | 17.1 |
| Comparative example 8-2 | Ru | None | Ta 3 nm | 247 | 8.9 | 13.2 |

(*1) SNR: Signal-to-noise ratio

In the comparative example 8-2, since the magnetic isolation of the crystal grains in the magnetic recording layer from one another is attained unsatisfactorily, both the coercivity and the signal-to-noise ratio are low. In the comparative example 8-1 having an MgO (oxide) oxide formed as the first intermediate layer, the magnetic separation of the crystal grains in the magnetic recording layer from one another has progressed. Therefore, the coercivity is larger, and the signal-to-noise ratio is higher. However, the c-axis dispersion angle of the magnetic recording layer is as large as about 11°. This signifies that the crystallographic texture of the magnetic recording layer is poor. In the eighth embodiment, the dispersion angle of the magnetic recording layer is about 4.3°, that is, smaller than a half of the one of the comparative example 8-1. Consequently, the signal-to-noise ratio presumably improves.

The foregoing results of assessment have revealed that even when a CoB/Pd multilayer film is adopted as a magnetic recording layer, if the compositions of intermediate layers employed in the present invention are adopted, the excellent crystallographic texture and magnetic isolation of crystal grains in the recording layer from one another can be attained, and a high signal-to-noise ratio can be offered.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A perpendicular magnetic recording medium having at least a soft-magnetic underlayer, a first intermediate layer, a second intermediate layer, a third intermediate layer, and a magnetic recording layer successively formed on a substrate, wherein:

said first intermediate layer is composed of any of the metals of Ti, Zr, and Hf or a non-magnetic alloy whose main component is at least one of Ti, Zr, and Hf having a hexagonal close-packed (hcp) structure;

said second intermediate layer is composed of any of the metals of Al, Ag, Au, Cu, Ni, and Pd or an alloy whose main component is at least one of Al, Ag, Au, Cu, Ni, and Pd;

said third intermediate layer is composed of Ru or an Ru alloy; and said magnetic recording layer is composed of ferromagnetic grains and of oxides or nitrides.

2. A perpendicular magnetic recording medium according to claim 1, wherein an average thickness of said second intermediate layer is equal to or larger than about 0.2 nm and equal to or smaller than about 3 nm.

3. A perpendicular magnetic recording medium according to claim 1, wherein an average thickness of said second intermediate layer is equal to or larger than about 0.4 nm and equal to or smaller than about 2 nm.

4. A perpendicular magnetic recording medium according to claim 1, wherein:

oxides exist in an interface between said first intermediate layer and said second intermediate layer composed of any of the metals of Ti, Zr, and Hf or an alloy whose main component is at least one of Ti, Zr, and Hf; and a squareness ratio measured using Kerr effect measuring equipment after a magnetic field is applied in a direction perpendicular to the surface of said medium is equal to or larger than about 0.9.

5. A perpendicular magnetic recording medium having at least a soft-magnetic underlayer, a first intermediate layer, a second intermediate layer, a third intermediate layer, and a magnetic recording layer successively formed on a substrate, wherein:

said first intermediate layer is composed of any of the metals of Ti, Zr, and Hf or an alloy whose main component is at least one of Ti, Zr, and Hf;

said second intermediate layer is composed of any of the metals of Al, Ag, Au, Cu, Ni, and Pd or an alloy whose main component is at least one of Al, Ag, Au, Cu, Ni, and Pd;

said third intermediate layer is composed of Ru or an Ru alloy; and said magnetic recording layer is composed of ferromagnetic grains and of oxides or nitrides, wherein said Ru alloy constituting said third intermediate layer contains at least one of oxygen and nitrogen.

6. A perpendicular magnetic recording medium according to claim 5, wherein said Ru alloy that constitutes said third intermediate layer and contains at least one of oxygen and nitrogen contains at least one of boron and silicon.

7. A perpendicular magnetic recording medium according to claim 1, wherein a Ta layer is interposed between said first intermediate layer and said soft-magnetic underlayer.

8. A perpendicular magnetic recording medium according to claim 1, wherein said ferromagnetic crystal grains constituting said magnetic recording layer are composed of an alloy whose main components are Co, Cr, and Pt.

9. A perpendicular magnetic recording medium having at least a soft-magnetic underlayer, a first intermediate layer, a second intermediate layer, a third intermediate layer, and a magnetic recording layer successively formed on a substrate, wherein:

said first intermediate layer is composed of any of the metals of Ti, Zr, and Hf or an alloy whose main component is at least one of Ti, Zr, and Hf;

said second intermediate layer is composed of any of the metals of Al, Ag, Au, Cu, Ni, and Pd or an alloy whose main component is at least one of Al, Ag, Au, Cu, Ni, and Pd;

said third intermediate layer is composed of Ru or an Ru alloy; and said magnetic recording layer is composed of ferromagnetic grains and of oxides or nitrides, wherein said ferromagnetic crystal grains constituting said magnetic recording layer have a structure that a layer made of Co or an alloy whose main component is Co and a layer made of Pd or Pt or an alloy whose main component is Pd or Pt are cyclically layered.

10. A perpendicular magnetic recording medium according to claim 9, wherein an average thickness of said second intermediate layer is equal to or larger than about 0.2 nm and equal to or smaller than about 3 nm.

11. A perpendicular magnetic recording medium according to claim 9, wherein an average thickness of said second intermediate layer is equal to or larger than about 0.4 nm and equal to or smaller than about 2 nm.

12. A perpendicular magnetic recording medium according to claim 9, wherein:

oxides exist in an interface between said first intermediate layer and said second intermediate layer composed of any of the metals of Ti, Zr, and Hf or an alloy whose main component is at least one of Ti, Zr, and Hf; and a squareness ratio measured using Kerr effect measuring equipment after a magnetic field is applied in a direction perpendicular to the surface of said medium is equal to or larger than about 0.9.

13. A perpendicular magnetic recording medium according to claim 9, wherein a Ta layer is interposed between said first intermediate layer and said soft-magnetic underlayer.

14. A perpendicular magnetic recording medium according to claim 9, wherein said ferromagnetic crystal grains constituting said magnetic recording layer are composed of an alloy whose main components are Co, Cr, and Pt.

15. A perpendicular magnetic recording medium according to claim 5, wherein an average thickness of said second intermediate layer is equal to or larger than about 0.2 nm and equal to or smaller than about 3 nm.

16. A perpendicular magnetic recording medium according to claim 5, wherein an average thickness of said second intermediate layer is equal to or larger than about 0.4 nm and equal to or smaller than about 2 nm.

17. A perpendicular magnetic recording medium according to claim 5, wherein:

oxides exist in an interface between said first intermediate layer and said second intermediate layer composed of any of the metals of Ti, Zr, and Hf or an alloy whose main component is at least one of Ti, Zr, and Hf; and a squareness ratio measured using Kerr effect measuring equipment after a magnetic field is applied in a direction perpendicular to the surface of said medium is equal to or larger than about 0.9.

18. A perpendicular magnetic recording medium according to claim 5, wherein a Ta layer is interposed between said first intermediate layer and said soft-magnetic underlayer.

19. A perpendicular magnetic recording medium according to claim 5, wherein said ferromagnetic crystal grains constituting said magnetic recording layer are composed of an alloy whose main components are Co, Cr, and Pt.

* * * * *